United States Patent
Moon

(10) Patent No.: US 10,915,206 B2
(45) Date of Patent: Feb. 9, 2021

(54) TOUCH SCREEN PANEL AND DISPLAY DEVICE INCLUDING THE SAME

(71) Applicant: LG Display Co., Ltd., Seoul (KR)

(72) Inventor: YoungGyu Moon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 45 days.

(21) Appl. No.: 15/994,924

(22) Filed: May 31, 2018

(65) Prior Publication Data

US 2019/0179445 A1    Jun. 13, 2019

(30) Foreign Application Priority Data

Dec. 8, 2017    (KR) .......................... 10-2017-0168728

(51) Int. Cl.
*G06F 3/044* (2006.01)
*G06F 3/041* (2006.01)
*G09G 3/20* (2006.01)

(52) U.S. Cl.
CPC ............ *G06F 3/044* (2013.01); *G06F 3/0412* (2013.01); *G06F 3/0416* (2013.01); *G09G 3/2003* (2013.01); *G06F 2203/04104* (2013.01); *G06F 2203/04112* (2013.01)

(58) Field of Classification Search
CPC ...... G06F 3/044; G06F 3/0416; G06F 3/0412; G06F 2203/04104; G06F 2203/04112; G09G 3/2003
See application file for complete search history.

(56) References Cited

U.S. PATENT DOCUMENTS

| 9,280,233 B1* | 3/2016 | Tong ................. G06F 3/04164 |
| 9,372,360 B2* | 6/2016 | Wang ................ G02F 1/134336 |
| 2011/0102370 A1* | 5/2011 | Kono ................. H03K 17/9622 |
| | | 345/174 |

(Continued)

FOREIGN PATENT DOCUMENTS

WO    WO 2017/160543 A1    9/2017

OTHER PUBLICATIONS

European Patent Office, Extended European Search Report and Opinion, EP Patent Application No. 18172894.0, dated Nov. 7, 2018, seven pages.

(Continued)

*Primary Examiner* — Grant Sitta
(74) *Attorney, Agent, or Firm* — Fenwick & West LLP

(57) ABSTRACT

A touch screen panel includes a plurality of touch sensors. A touch sensor includes a first touch electrode unit that includes a plurality of first mesh pattern electrodes disposed to be spaced apart from each other in a sensing area where the first touch electrode unit and the second touch electrode unit intersect. The touch sensor also includes a second touch electrode unit that includes a plurality of second mesh pattern electrodes disposed between the plurality of first mesh pattern electrodes in the sensing area to be spaced apart from each other. The touch sensors also includes a at least one floating electrode disposed between the plurality of first mesh pattern electrodes and the plurality of second mesh pattern electrodes. The dielectric breakdown of the first touch electrode unit and the second touch electrode unit is suppressed to improve reliability of the touch screen panel.

23 Claims, 17 Drawing Sheets

(56) References Cited

U.S. PATENT DOCUMENTS

| | | | |
|---|---|---|---|
| 2012/0081300 A1* | 4/2012 | Chan | G06F 3/047 345/173 |
| 2013/0278513 A1* | 10/2013 | Jang | G06F 3/047 345/173 |
| 2014/0049271 A1* | 2/2014 | Trend | G06F 3/044 324/663 |
| 2014/0069796 A1* | 3/2014 | Kang | G06F 1/1652 200/600 |
| 2014/0098304 A1* | 4/2014 | Kim | G06F 3/0446 349/12 |
| 2014/0152580 A1 | 6/2014 | Weaver et al. | |
| 2014/0152916 A1* | 6/2014 | Nakamura | G06F 3/044 349/12 |
| 2014/0210749 A1* | 7/2014 | Park | G06F 3/0446 345/173 |
| 2015/0185916 A1* | 7/2015 | Kang | G06F 3/044 345/174 |
| 2015/0193034 A1* | 7/2015 | Jeong | G06F 3/044 345/173 |
| 2015/0363024 A1* | 12/2015 | Hayashi | G06F 3/044 345/174 |
| 2015/0370375 A1* | 12/2015 | Hayashi | G06F 3/0412 345/174 |
| 2016/0048248 A1* | 2/2016 | Na | G06F 3/047 345/174 |
| 2016/0103520 A1 | 4/2016 | Kim et al. | |
| 2016/0342256 A1* | 11/2016 | Zhou | G02F 1/13439 |
| 2017/0010745 A1* | 1/2017 | Liu | G06F 3/044 |
| 2017/0160870 A1 | 6/2017 | Lee et al. | |
| 2017/0192508 A1* | 7/2017 | Lim | G06F 3/016 |
| 2017/0336898 A1* | 11/2017 | Maede | G06F 3/044 |
| 2017/0336907 A1* | 11/2017 | Jeong | G06F 3/0448 |
| 2018/0095581 A1* | 4/2018 | Hwang | G06F 3/0412 |
| 2018/0095582 A1* | 4/2018 | Hwang | H01L 27/322 |
| 2018/0143691 A1* | 5/2018 | Asai | G06F 3/0416 |
| 2018/0224984 A1* | 8/2018 | Kim | G06F 3/0418 |

OTHER PUBLICATIONS

European Patent Office, Communication pursuant to Article 94(3) EPC, EP Patent Application No. 18172894.0, dated Feb. 19, 2020, six pages.

* cited by examiner

TOUCH SCREEN PANEL AND DISPLAY DEVICE INCLUDING THE SAME

CROSS-REFERENCE TO RELATED APPLICATIONS

This application claims the priority of Korean Patent Application No. 10-2017-0168728 filed on Dec. 8, 2017, in the Korean Intellectual Property Office, the disclosure of which is incorporated herein by reference in its entirety.

BACKGROUND

Technical Field

The present disclosure relates to a touch screen panel and a display device including the same, and more particularly to a metal-mesh type touch screen panel with an improved reliability and a display device including the same.

Description of the Related Art

A touch screen panel is a device which uses screen touch or a gesture of a user as input information and is mounted on personal portable electronic devices such as smart phones or tablet PCs to be widely used. The touch screen panel is used to be disposed close to a device for displaying images such as a display panel, and users may generally input touches to the image displayed on the display panel.

Generally, the touch screen panel includes a touch sensing electrode for sensing a touch input of the user and as the touch sensing electrode of the touch screen panel, a transparent electrode formed of a transparent conductive material, such as indium-tin-oxide (ITO), is used to allow the user to visibly recognize images disposed on the display panel.

SUMMARY

ITO used for the touch sensing electrode of the touch screen panel has a lower flexibility than other ordinary metallic materials. Therefore, when the touch screen panel, which uses ITO as a material of the touch sensing electrode, is applied to a flexible display device, ITO may be cracked or damaged and such defects to the touch screen panel may cause various problems. Further, since ITO has a higher sheet-resistance than that of the metallic materials, when the touch screen panel, which is implemented with an ITO for a material of the touch sensing electrode, is applied to a large size display device, there may be problems in driving the touch screen panel due to the high sheet-resistance of ITO. Further, a transparent conductive oxide material such as ITO may reduce transmittance so that an image to be displayed on a display device may be deteriorated. Furthermore, since ITO is a rare-earth material that is relatively expensive, the total manufacturing cost of the touch screen panel is increased. Therefore, the inventors of the present disclosure developed a new touch screen panel of a metal-mesh type for solving the problems of the conventional touch screen panel which uses ITO as a material for the touch sensing electrode. However, due to a high voltage potential difference at an intersection (i.e., a crossing area) of the metal-meshes, undesired current may flow between the different metal-meshes. Therefore, dielectric breakdown can occur between the different metal-meshes so that short circuits may be caused at such overlapping points of metal-meshes.

Therefore, an object to be achieved by the present disclosure is to provide a touch screen panel which suppresses short-circuits at a metal-mesh overlapping point by reducing a potential difference between metal-meshes and a display device including the same.

Another object to be achieved by the present disclosure is to provide a touch screen panel which includes a floating electrode between metal-meshes to reduce induced charges between the metal-meshes and a display device including the same.

The objects of the present disclosure are not limited to the above-mentioned objects, and other objects, which are not mentioned above, can be clearly understood by those skilled in the art from the following descriptions.

Other detailed matters of the embodiments are included in the detailed description and the drawings.

According to the present disclosure, the touch screen panel may form at least one floating electrode between a first mesh pattern electrode and a connection pattern electrode to reduce capacitance formed between the first mesh pattern electrode and the connection pattern electrode.

According to the present disclosure, the touch screen panel reduces a quantity of charges induced between a first mesh pattern electrode and a connection pattern electrode to reduce a potential difference between a second internal connection line which is electrically connected to the connection pattern electrode and the first mesh pattern electrode.

According to the present disclosure, the touch screen panel may suppress induced current from flowing through the second internal connection line and the first mesh pattern electrode to suppress dielectric breakdown due to deterioration, thereby improving reliability of a touch screen panel.

Embodiments also relate to a touch screen panel for detecting a touch input. The touch screen panel includes a plurality of touch sensors on a substrate. Each touch sensor includes a first pattern electrode on the substrate extending along a first direction. The first pattern electrode may have a first mesh pattern. The touch sensor also includes a first connection line electrically connected to the first pattern electrode. The first connection line may extend along a second direction different from the first direction. The touch sensor also includes a second pattern electrode on the substrate adjacent to the first pattern electrode. The second pattern electrode may extend along the first direction and may have a second mesh pattern. The touch sensor also includes a second connection line electrically connected to the second pattern electrode. The second connection line may extend along the second direction and overlap with at least a portion of the first pattern electrode. The touch sensor also includes a first floating electrode disposed in between the first pattern electrode and the second pattern electrode. The first floating electrode may be physically spaced apart from the first pattern electrode and the second pattern electrode.

Embodiments also relate to a touch screen panel for detecting a touch input. The touch screen panel includes a plurality of touch sensors on a substrate. Each touch sensor includes a first pattern electrode on the substrate extending along a first direction. The touch sensor also includes a second pattern electrode on the substrate extending along the first direction. The touch sensor also includes a first floating electrode disposed in between the first pattern electrode and the second pattern electrode. The first floating electrode may be physically spaced apart from the first pattern electrode and the second pattern electrode. The touch sensor also includes an insulating layer on the first pattern electrode, the second pattern electrode, and the first floating electrode. The touch sensor also includes a third pattern electrode on the insulating layer extending along the first direction. The touch sensor also includes a first connection line on the insulating layer. The first connection line may extend from the third pattern electrode in a second direction different from the first direction to overlap at least a portion of the first pattern electrode. The second pattern electrode may be electrically connected to the third pattern electrode through the first connection line.

Embodiments also relate to an apparatus. The apparatus includes a substrate having an array of pixels used for displaying images on a display screen. The apparatus also includes a touch electrode structure over the array of pixels to allow detection of user touch inputs applied on the display screen. The touch electrode structure may include a layer of metal mesh type touch signal transmitting electrodes and a layer of metal mesh type touch signal receiving electrodes on a planar level above the transmitting electrodes. The receiving electrodes may have additional wire branches that extend along the same planar level as the transmitting electrodes. The wire branches may have specific shapes and dimensions to maximize a total surface area of the receiving electrodes to thus increase an amount of mutual capacitance or self-capacitance, and also to minimize any potential parasitic capacitance being formed at regions where portions of the transmitting electrodes and portions of the receiving electrodes overlap or cross over.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
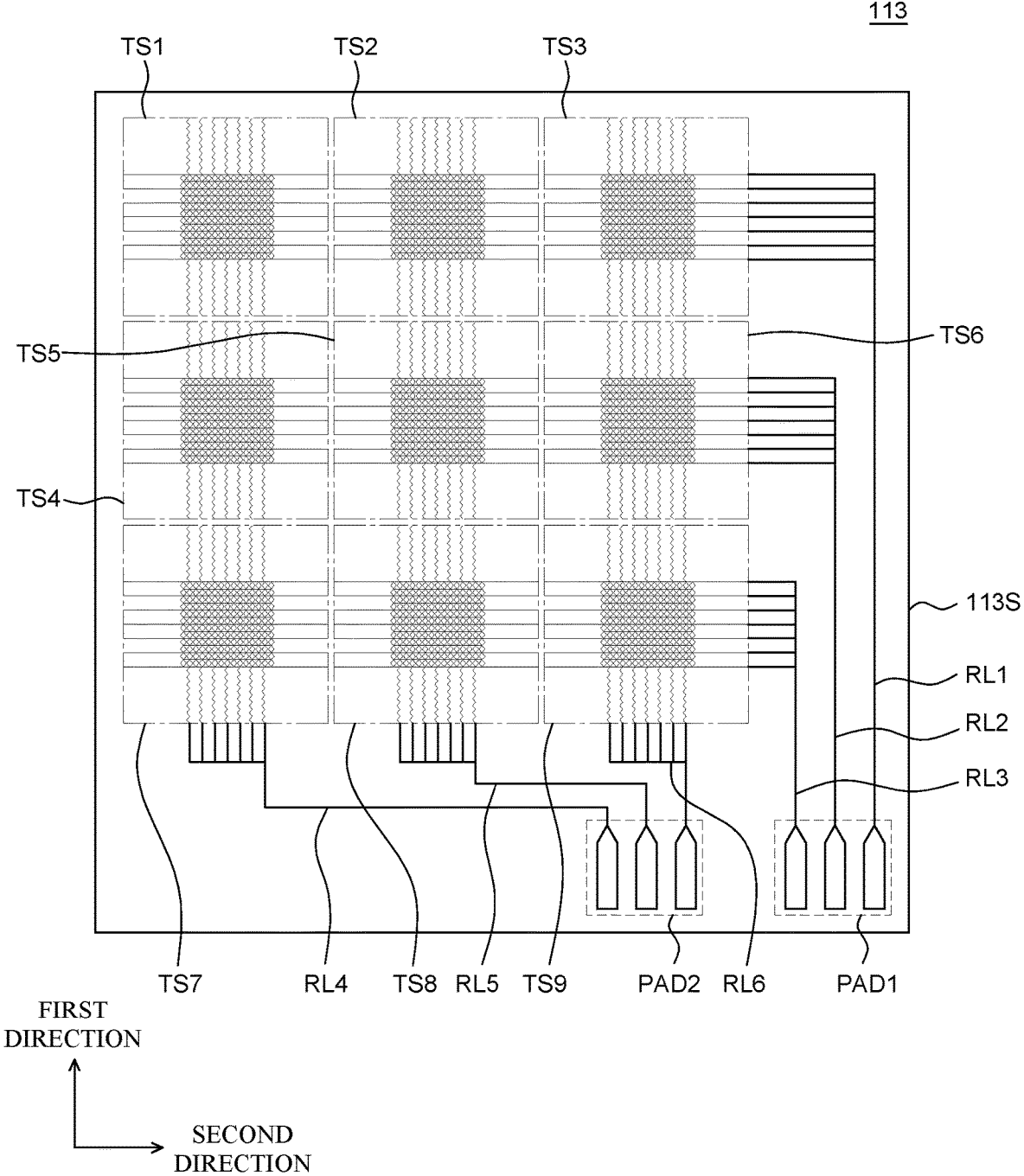
FIG. 1 is a view for explaining a touch screen panel according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments of the present disclosure are provided merely for illustrative purposes. Thus, a person of ordinary skilled in the art can fully understand the features of the present disclosure and the scope of the present disclosure. However, it should be noted that the scope of the present disclosure will be defined only by the scope of the appended claims.

Further, in the following description, a detailed explanation of known related technologies may be omitted to avoid unnecessarily obscuring the subject matter of the present disclosure. The terms such as "including," "having," "comprising," and "consist of" used herein are generally intended to allow other components to be added unless the terms are used with the term "only". Any references to singular may include plural unless expressly stated otherwise.

Components are interpreted to include an ordinary error range even if not expressly stated.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

The features of various embodiments of the present disclosure can be partially or entirely bonded to or combined with each other and can be interlocked and operated in technically various ways understood by those skilled in the art, and the embodiments can be carried out independently of or in association with each other.

Hereinafter, various exemplary embodiments of the present disclosure will be described in detail with reference to accompanying drawings.

FIG. 1 is a view for explaining a touch screen panel according to an exemplary embodiment of the present disclosure.

Referring to FIG. 1, a touch screen panel 113 according to an exemplary embodiment of the present disclosure may include a plurality of touch sensors TS1 to TS9 which is disposed on a substrate 113S in a matrix form and senses a user's touch to operate a touch detection, a plurality of pads PAD1 and PAD2 connected to an external touch driving unit, and a plurality of routing lines RL1 to RL6 which connects the plurality of touch sensors TS1 to TS9 and the plurality of pads PAD1 and PAD2. However, the present disclosure is not limited thereto, and the number of touch sensors, the number of pads, and the number of routing lines may vary according to its touch screen size or its application.

In addition, a touch sensor may be referred as a touch sensor block.

The substrate 113S may be formed of a transparent and flexible material. For example, the substrate 113S may be formed of plastic which is transparent and has a bendable property, such as polyethylene terephthalate (PET) or polyimide (PI). However, the present disclosure is not limited thereto, and the substrate may be a translucent material or a rigid material.

The plurality of touch sensors TS1 to TS9 are connected to each other and the plurality of touch sensors TS1 to TS9 connected to each other are connected to the plurality of pads PAD1 and PAD2 through the plurality of routing lines RL1 to RL6. Accordingly, each of the touch sensors TS1 to TS9 is applied with a touch signal for sensing touch from the external touch driving unit to sense the touch.

For example, as illustrated in FIG. 1, the plurality of touch sensors TS1 to TS9 may be configured by first to ninth touch sensors TS1 to TS9 disposed in a 3×3 matrix form.

However, the arrangement of the plurality of touch sensors is not limited thereto, and may be expanded in various ways.

Further, the first, fourth, and seventh touch sensors TS1, TS4, and TS7 disposed in a first direction are connected to the second pad PAD2 through the fourth routing line RS4, the second, fifth and eighth touch sensors TS2, TS5, and TS8 disposed in the first direction are connected to the second pad PAD2 through the fifth routing line RL5, and the third, sixth and ninth touch sensors TS3, TS6, and TS9 disposed in the first direction are connected to the second pad PAD2 through the sixth routing line RL6. However, the present disclosure is not limited to the above-described routing configuration, and may be modified in various ways.

The first to third touch sensors TS1, TS2, and TS3 disposed in a second direction are connected to the first pad PAD1 through the first routing line RS1, the fourth to sixth touch sensors TS4, TS5, and TS6 disposed in the second direction are connected to the first pad PAD1 through the second routing line RL2, and the seventh to ninth touch sensors TS7, TS8, and TS9 disposed in the second direction are connected to the first pad PAD1 through the third routing line RL3. However, the present disclosure is not limited to the above-described routing configuration, and may be modified in various ways.

Here, different touch signals may be applied to the first pad PAD1 and the second pad PAD2 to drive the touch screen panel 113 with a mutual-capacitive touch sensing technique and the same type of the touch signal may be applied to the first pad PAD1 and the second pad PAD2 to drive the touch screen panel 113 with a self-capacitive touch sensing technique.

Figure 2A:
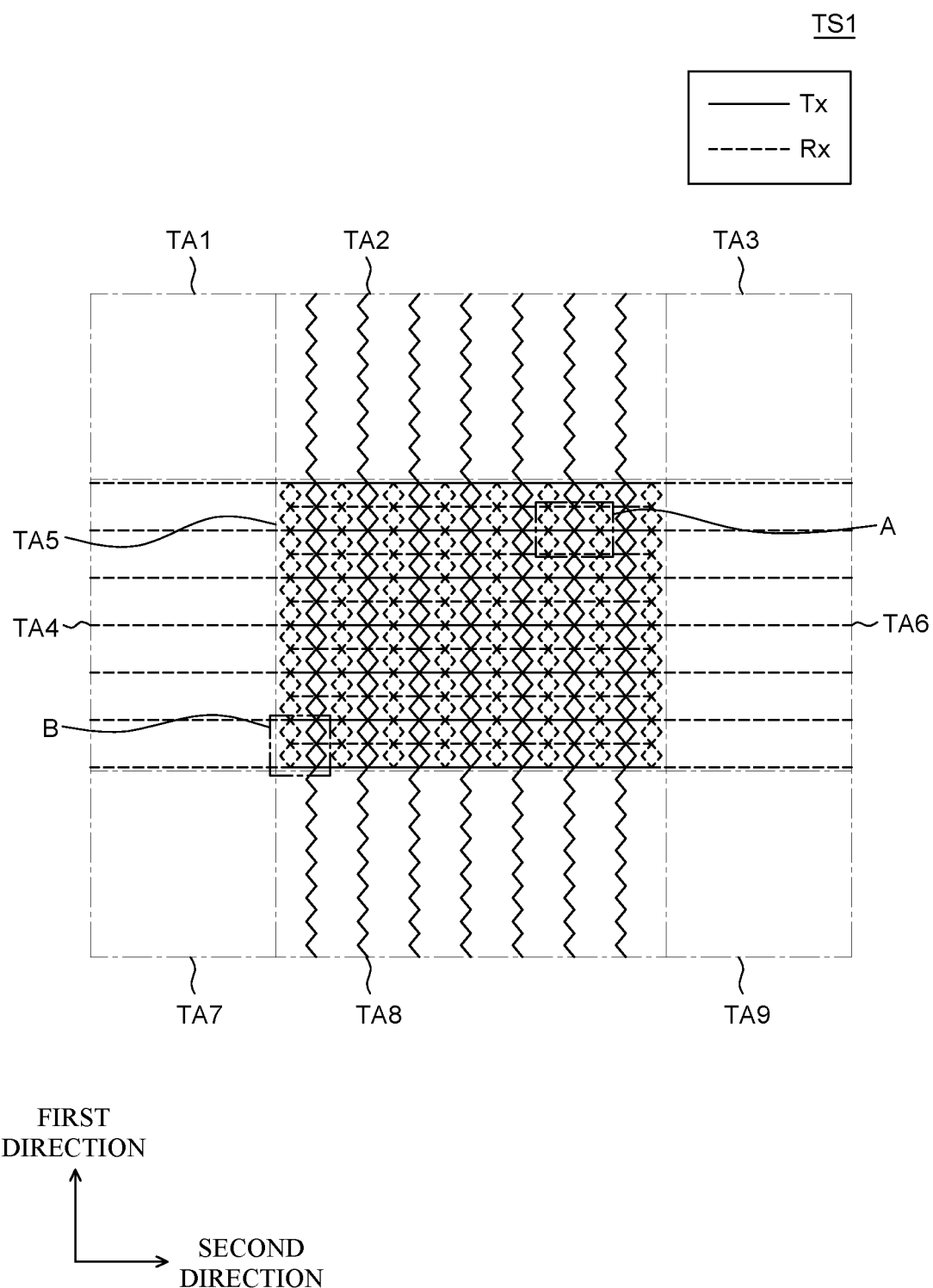
FIG. 2A is a view for explaining a touch sensor of a touch screen panel according to an exemplary embodiment of the present disclosure.
Figure 2B:
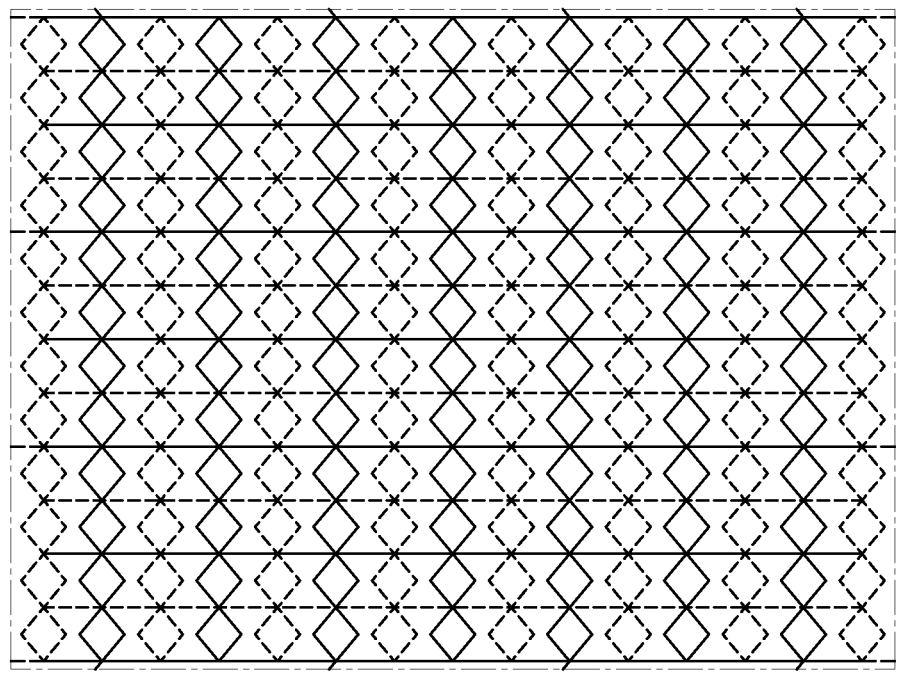
FIG. 2B is a view for explaining a sensing area of a touch screen panel according to an exemplary embodiment of the present disclosure.

FIG. 2A is a view for explaining a touch sensor block of a touch screen panel according to an exemplary embodiment of the present disclosure. FIG. 2B is a view for illustrating a sensing area of the touch sensor block of a touch screen panel according to an exemplary embodiment of the present disclosure.

Specifically, FIG. 2A is a view for illustrating a first touch electrode unit Tx and a second touch electrode unit Rx disposed in the touch sensor TS of the touch screen panel 113.

In FIG. 2A, the first touch sensor TS1 among the plurality of touch sensors TS1 to TS9 will be mainly described. The remaining second to ninth touch sensors TS2 to TS9 have the substantially same structure as the first touch sensor TS1. Thus, redundant features of the touch sensors may be omitted merely for the sake of convenience of the explanation. In addition, the touch sensor is not limited thereto and a size and a design of each of the touch sensors may be partially modified at an outer periphery of the touch screen panel 113. In FIG. 2A, the first touch electrode unit Tx is represented by a solid line and the second touch electrode unit Rx is represented by a dotted line. The respective touch electrode units may be realized in a straight line shape, a zigzag line shape, a wavy line shape, and the like.

As illustrated in FIG. 2A, the first touch sensor TS1 includes the first touch electrode unit Tx extended in a first direction and the second touch electrode unit Rx extended in a second direction.

The first touch electrode unit Tx is applied with a touch signal through the fourth routing line RL4 and the second touch electrode unit Rx is applied with a touch signal through the first routing line RL1. Here, the first touch electrode unit Tx and the second touch electrode unit Rx may transmit and receive different touch signals to drive the touch screen panel 113 in a mutual-capacitive touch sensing manner. Further, the same touch signal may be applied to the first touch electrode unit Tx and the second touch electrode unit Rx to drive the touch screen panel 113 in a self-capacitive touch sensing manner.

Further, as illustrated in FIG. 2A, the first touch sensor TS1 may be divided into first to ninth touch areas TA1 to TA9 with respect to an arrangement relationship of the first touch electrode unit Tx and the second touch electrode unit Rx. It should be noted that the above-described areas are merely illustrative purpose for the sake of convenience of explanation. Therefore, the present disclosure is not limited to the above-described areas.

Specifically, an area where the first touch electrode unit Tx extended in the first direction and the second touch electrode unit Rx extended in the second direction intersect each other is defined as a fifth touch area TA5 or a sensing area positioned at a center portion of the first touch sensor TS1. Areas adjacent to the top, bottom, left, and right of the fifth touch area TA5 are defined as second, fourth, sixth, and eighth touch areas TA2, TA4, TA6, and TA8. Further, areas adjacent to the fifth touch areas TA5 along a diagonal direction are defined as first, third, seventh, and ninth touch areas TA1, TA3, TA7, and TA9.

That is, the first to third touch areas TA1 to TA3 are arranged in upper portions of the first touch sensor TS1 in the second direction, the fourth to sixth touch areas TA4 to TA6 are arranged in the middle portions of the first touch sensor TS1 in the second direction, and the seventh to ninth touch areas TA7 to TA9 are arranged in lower portions of the first touch sensor TS1 in the second direction. However, the present disclosure is not limited to the directions or positions of the touch areas and the touch areas may be rearranged according to its size, application, and the like.

Accordingly, the first touch electrode unit Tx extended in the first direction may be arranged through the second, fifth, and eighth touch areas TA2, TA5, and TA8 and the second touch electrode unit Rx extended in the second direction may be arranged through the fourth, fifth, and sixth touch areas TA4, TA5, and TA6. In other words, the first touch electrode unit Tx may extend in the first direction at the center portion of the first touch sensor TS1. The second touch electrode unit Rx may extend in the second direction at the center portion of the first touch sensor TS1. Further, the first touch electrode unit Tx and the second touch electrode unit Rx may be configured to intersect each other at the center portion of the first touch sensor TS1.

As illustrated in FIG. 2B, the first touch electrode unit Tx disposed in the fifth touch area TA5 which is a sensing area may include a first mesh pattern electrode and the second touch electrode unit Rx disposed in the fifth touch area TA5 may include a second mesh pattern electrode. Here, the touch operation of the user may be sensed by sensing a change in mutual-capacitance between the first mesh pattern electrode and the second mesh pattern electrode. An electrode with a mesh pattern may include a network of conductive material interleaved together to form the electrode.

Hereinafter, the first touch electrode unit Tx and the second touch electrode unit Rx disposed in the first touch sensor TS1 will be described in detail with reference to FIGS. 3A to 4B.

Figure 3A:
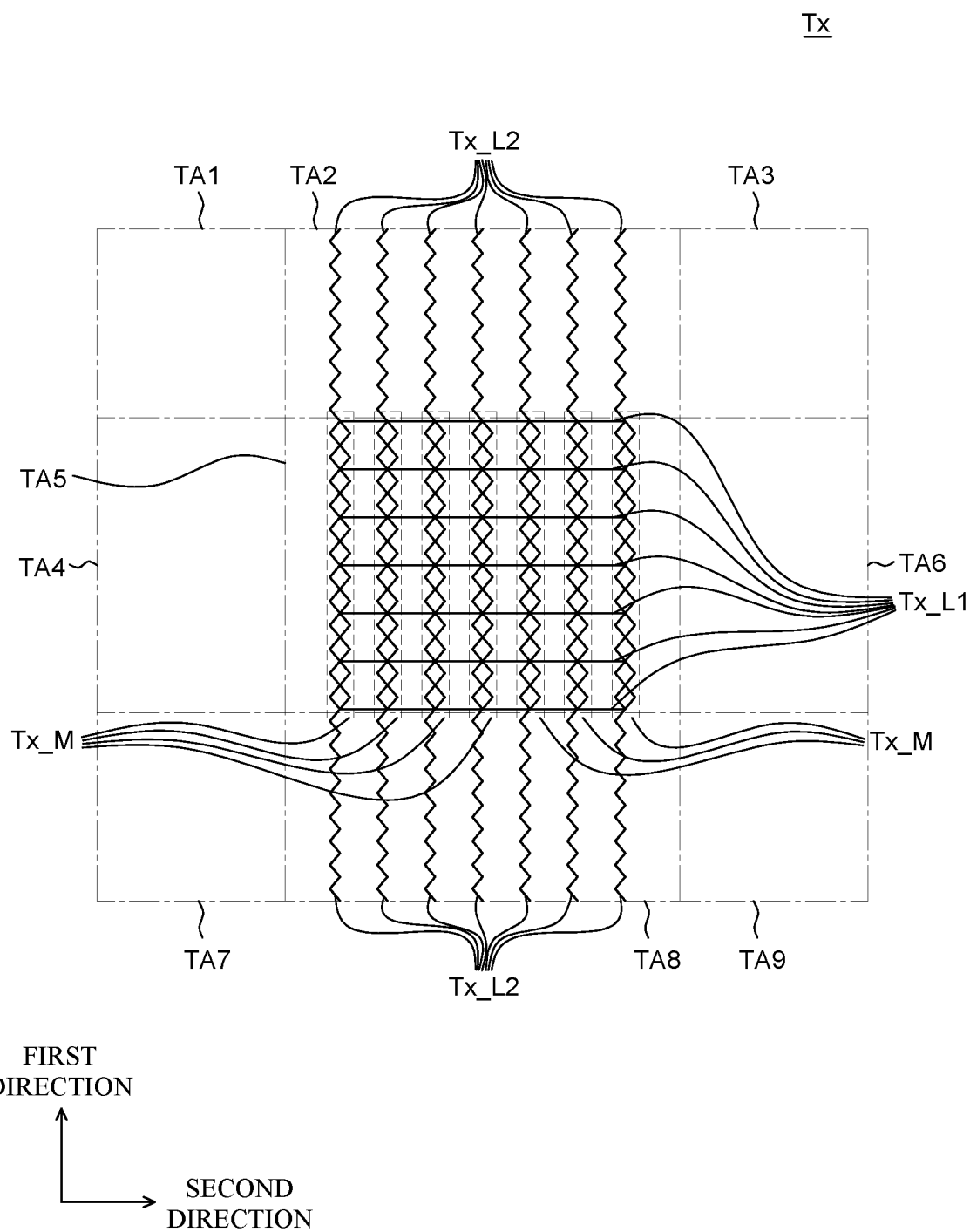
FIG. 3A is a view for explaining a first touch electrode unit of a touch screen panel according to an exemplary embodiment of the present disclosure.
Figure 3B:
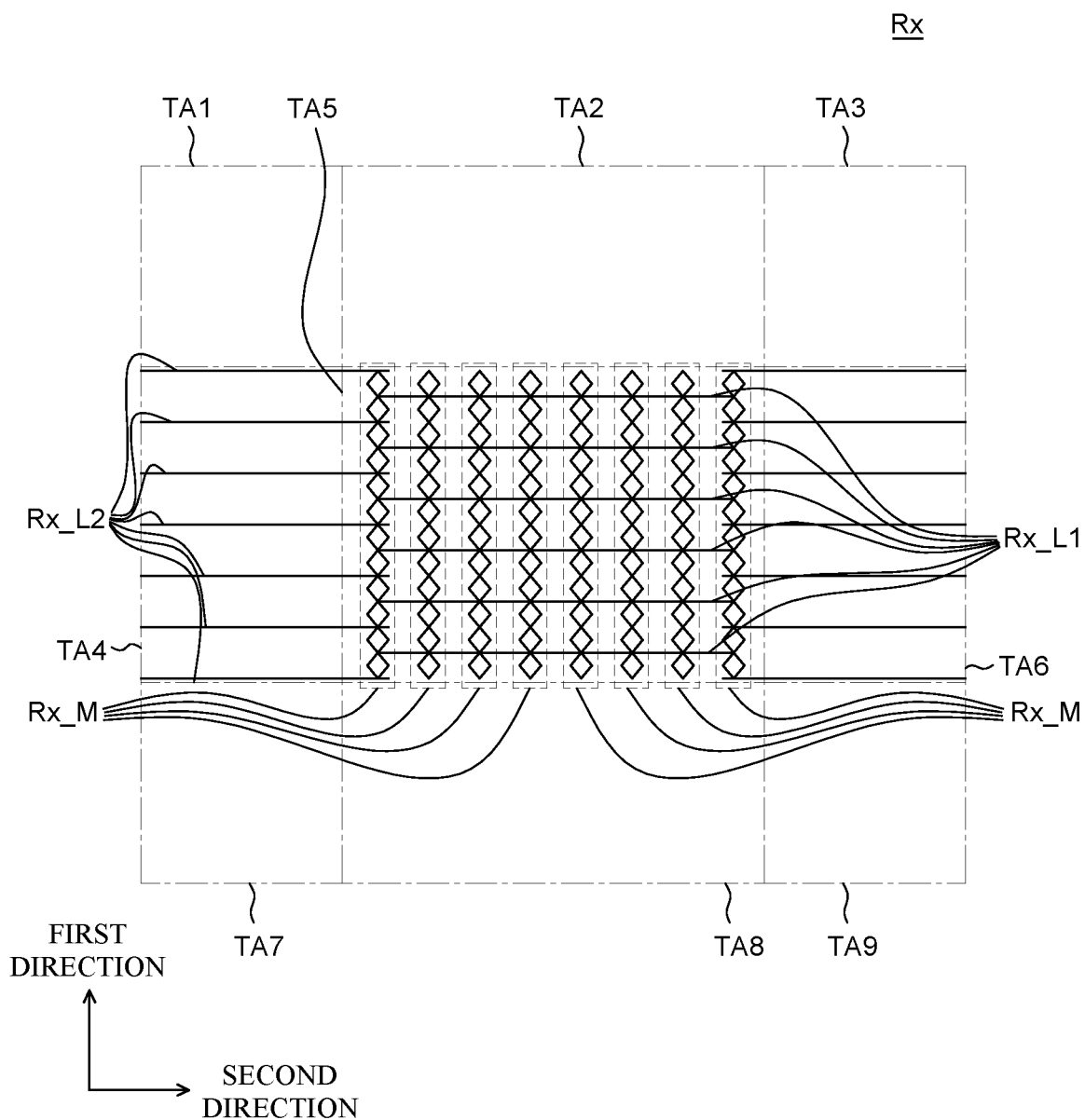
FIG. 3B is a view for explaining a second touch electrode unit of a touch screen panel according to an exemplary embodiment of the present disclosure.

FIG. 3A is a view for illustrating a first touch electrode unit Tx of a touch screen panel according to an exemplary embodiment of the present disclosure. FIG. 3B is a view for explaining a second touch electrode unit Rx of a touch screen panel according to an exemplary embodiment of the present disclosure.

The first touch electrode unit Tx illustrated in FIG. 3A and the second touch electrode unit Rx illustrated in FIG. 3B are separately illustrated merely for the sake of convenience of explanation. In addition, in the touch screen panel 113 according to an exemplary embodiment of the present disclosure, the first touch electrode unit Tx and the second touch electrode unit Rx may be configured to overlap partially in the fifth touch area TA5.

As illustrated in FIG. 3A, the first touch electrode unit Tx includes a plurality of first mesh pattern electrodes Tx_M and a plurality of first internal connection lines Tx_L1 disposed in the fifth touch area TA5 and a plurality of first external connection lines Tx_L2 disposed in the second touch area TA2 and the eighth touch area TA8.

The plurality of first mesh pattern electrodes Tx_M is disposed in the fifth touch area TA5 to sense the touch operation.

Specifically, the plurality of first mesh pattern electrodes Tx_M extended in the first direction is spaced apart from each other in the second direction. Since the plurality of first mesh pattern electrodes Tx_M extended in the first direction is spaced apart from each other, a space between the first mesh pattern electrodes Tx_M may be generated.

The first mesh pattern electrodes Tx_M illustrated in FIG. 3A extend in one or more columns, but is not limited thereto and various types of mesh pattern electrode may be formed. Specifically, the mesh pattern electrode may be configured to be located in the middle between a plurality of sub-pixels R, G, and B in a bank area between the plurality of sub-pixels R, G, and B. In addition, the shape of the mesh pattern electrodes may be determined according to the shape of the sub-pixels and the shape of the bank area.

The plurality of first internal connection lines Tx_L1 electrically connects the plurality of first mesh pattern electrodes Tx_M disposed to be spaced apart from each other to effectively transmit a touch signal between the first mesh pattern electrodes Tx_M disposed to be spaced apart from each other.

Specifically, the plurality of first internal connection lines Tx_L1 extends in the second direction and is disposed to be spaced apart from each other to electrically connect the plurality of first mesh pattern electrodes Tx_M extended in the first direction to each other. In addition, the shape of the internal connection lines may be determined according to the shape of the sub-pixels and the shape of the bank area.

By doing this, the touch signal may be effectively shared by all of the plurality of first mesh pattern electrodes Tx_M.

Further, even though the first internal connection lines Tx_L1 may be formed in various patterns, such as a zigzag pattern, the first internal connection lines may be a straight line extended in the second direction. The plurality of first internal connection lines Tx_L1 is formed to be a straight line so that resistance of the first internal connection lines Tx_L1 may be reduced. By doing this, the touch signal applied through the first internal connection lines Tx_L1 is effectively transmitted so that a response speed of the touch screen panel 113 may be improved. However, the first internal connection lines Tx_L1 is illustratively expressed as a straight line, but the present disclosure is not limited thereto and the first internal connection lines Tx_L1 may be configured in a pattern which is not a straight line. The first internal connection lines Tx_L1 may be formed along banks between the plurality of sub-pixels R, G, and B in a direction intersecting the first external connection lines Tx_L2.

In other words, in order to form the first internal connection lines Tx_L1 to be a straight line, a shape of the sub-pixels may be modified. For example, in order to form the first internal connection lines Tx_L1 to be a straight line, shapes of the sub-pixels R and G located on both sides of the first internal connection lines Tx_L1 may be designed in the form of facing triangles. Here, the shapes of the sub-pixels R and G may be triangles and one sides of the triangles are parallel to each other with respect to the first internal connection lines Tx_L1 as will be described later in more detail in conjunction with FIG. 12.

The plurality of first external connection lines Tx_L2 serves to connect the first mesh pattern electrode Tx_M of the touch sensor TS with an external component.

That is, the plurality of first external connection lines Tx_L2 interconnects the plurality of first mesh pattern electrodes Tx_M with another touch sensor TS adjacent thereto. For example, the plurality of first external connection lines Tx_L2 connects the plurality of first mesh pattern electrodes Tx_M with the fourth to sixth routing lines RL4 to RL6.

Specifically, the plurality of first external connection lines Tx_L2 with respect to the seventh touch sensor TS7 illustrated in FIG. 1 will be described. The plurality of first external connection lines Tx_L2 disposed in the second touch area TA2 of the seventh touch sensor TS7 is connected to the fourth touch sensor TS4 disposed above the seventh touch sensor TS7. The plurality of first external connection lines Tx_L2 disposed in the eighth touch area TA8 of the seventh touch sensor TS7 is connected to the fourth routing line RL4 disposed below the seventh touch sensor TS7.

Here, the plurality of first external connection lines Tx_L2 may be formed to have various shapes such as a straight line or a mesh pattern, but may be desirably formed to have a zigzag pattern in consideration of the shape of the sub-pixels of the display device, and the shape of the bank BNK in consideration of the transmittance and the viewing angle of the sub-pixel.

Further, the plurality of first mesh pattern electrodes Tx_M, the first internal connection lines Tx_L1, and the first external connection lines Tx_L2 which configure the first touch electrode unit Tx may be formed of the same layer. That is, a layer on which the first mesh pattern electrodes Tx_M are formed, a layer on which the first internal connection lines Tx_L1 are formed, and a layer on which the first external connection lines Tx_L2 are formed may be the first layer. Therefore, the first touch electrode unit Tx may be formed by one manufacturing process.

Further, the plurality of first mesh pattern electrodes Tx_M, the first internal connection lines Tx_L1, and the first external connection lines Tx_L2 which configure the first touch electrode unit Tx may be formed of a metal having a high electric conductivity. For example, the plurality of first mesh pattern electrodes Tx_M, the first internal connection lines Tx_L1, and the first external connection lines Tx_L2 which configure the first touch electrode unit Tx may be formed of a single layer or multiple layers formed of aluminum (Al), copper (Cu), molybdenum (Mo), chrome (Cr), gold (Au), titanium (Ti), nickel (Ni), neodymium (Nd), or an alloy thereof. The first touch electrode unit Tx is formed of the metal having excellent electric conductivity so that a touch signal for driving the touch screen panel 113 may be quickly transmitted from the external touch driving unit to the first touch electrode unit Tx. Since a transmitting speed of the touch signal is improved, the touch driving unit may quickly sense the touch operation of the user so that the response speed of the touch screen panel 113 may be improved.

As illustrated in FIG. 3B, the second touch electrode unit Rx includes a plurality of second mesh pattern electrodes Rx_M and a plurality of second internal connection lines Rx_L1, and connection pattern electrodes disposed in the fifth touch area TA5 and a plurality of second external connection lines Rx_L2 disposed in the fourth touch area TA4 and the sixth touch area TA6. The second internal connection line Rx_L1 and the second external connection line Rx_L2 are electrically connected to each other through the second mesh pattern electrodes Rx_M. Here, the second internal connection line Rx_L1 and the first internal connection line Tx_L1 are disposed so as not to overlap each other. For example, both the second internal connection line Rx_L1 and the first internal connection line Tx_L1 may be straight lines which extend in the second direction to be parallel to each other.

In addition, more detailed descriptions regarding the shape of the mesh pattern electrodes, the shape of the internal connection lines, and the shape of the external connection lines will be described below with reference to FIG. 12.

Figure 4A:
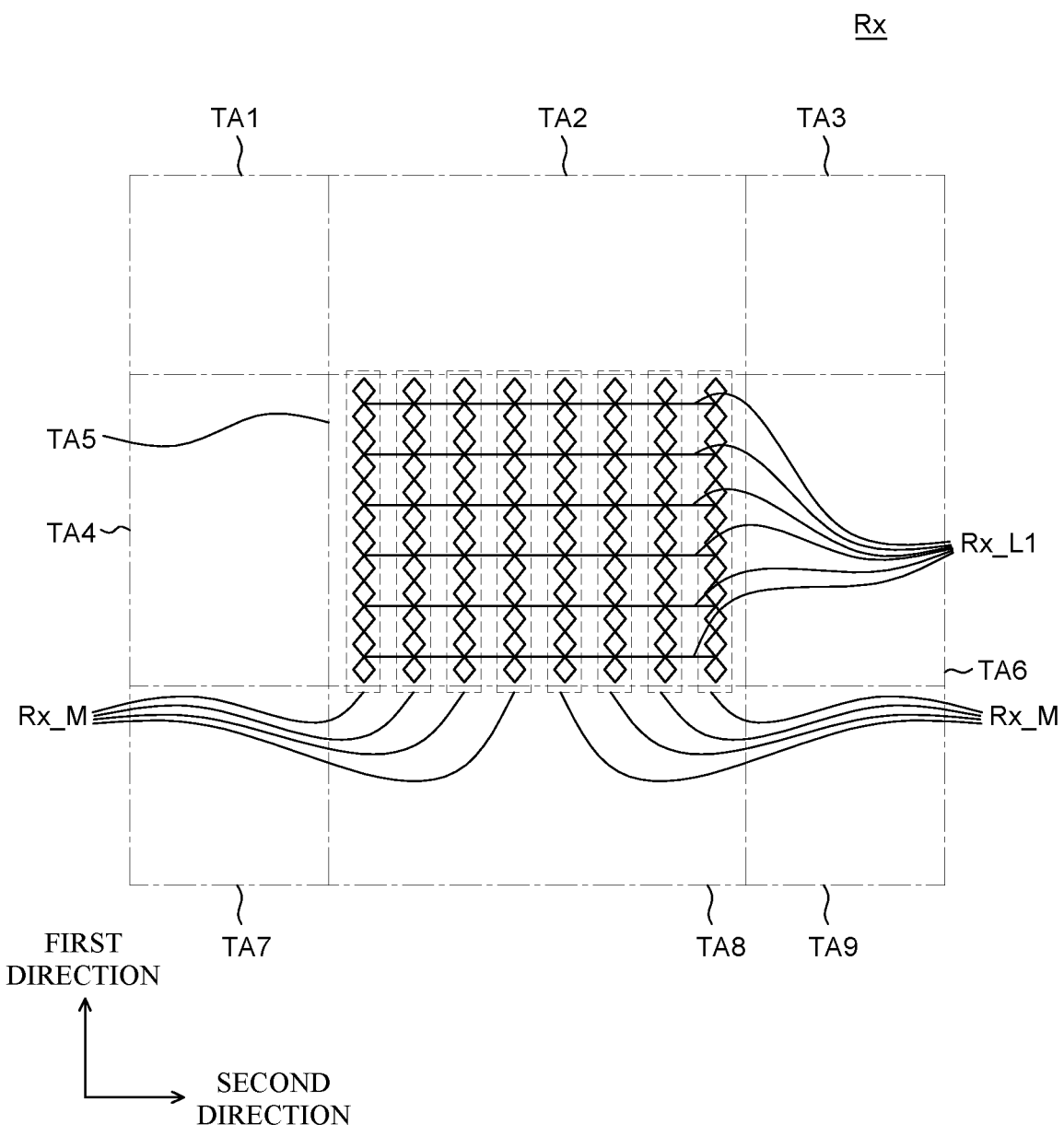
FIG. 4A is a view selectively illustrating a part of each component for ease of explanation of a second mesh pattern electrode and a second internal connection line of a touch screen panel according to an exemplary embodiment of the present disclosure.
Figure 4B:
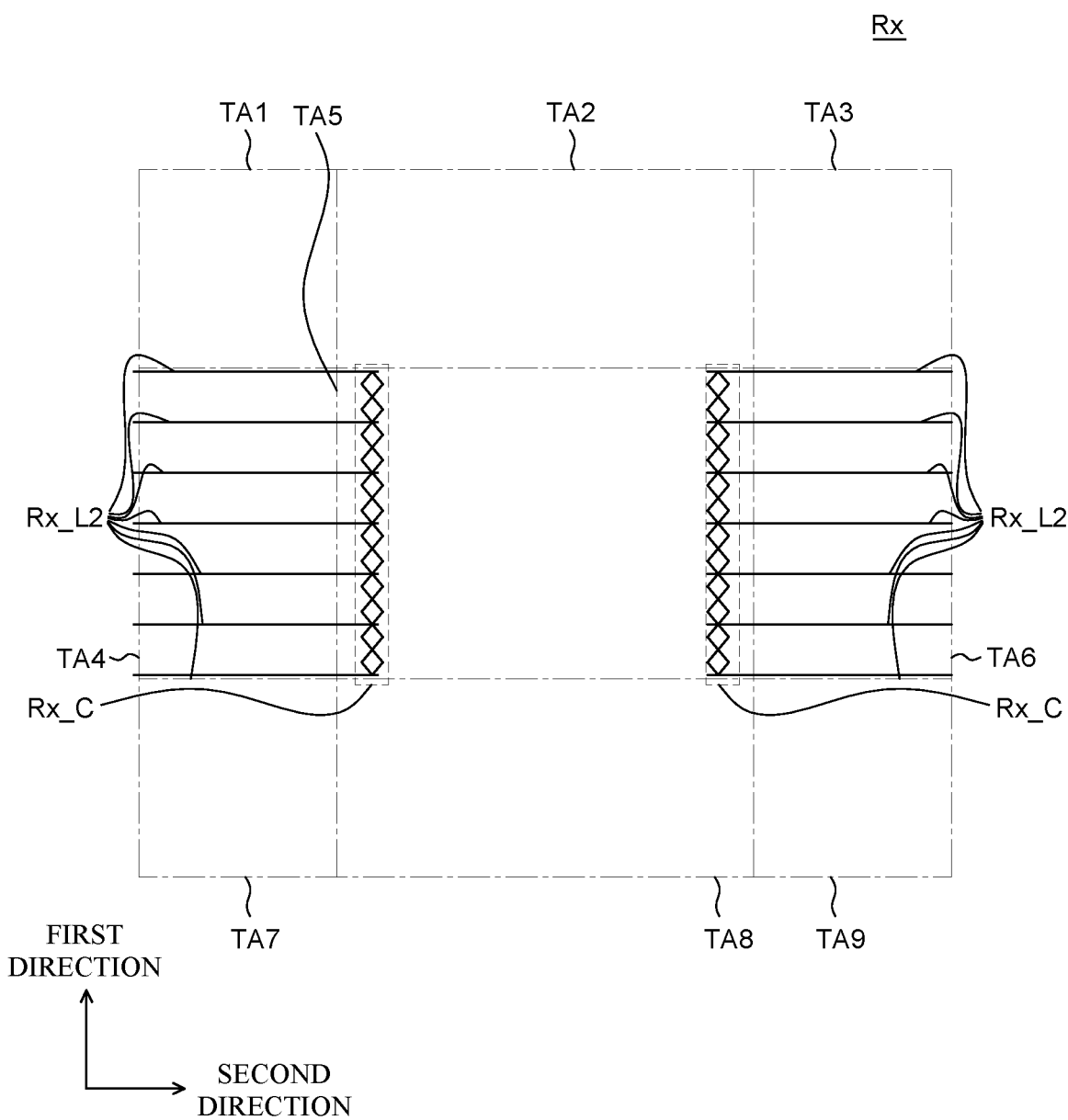
FIG. 4B is a view selectively illustrating a part of each component for ease of explanation of a second external connection line and a connection pattern electrode of a touch screen panel according to an exemplary embodiment of the present disclosure.

FIG. 4A is a view selectively illustrating a portion of each component merely for the sake of convenience of explanation of a second mesh pattern electrode and a second internal connection line of a touch screen panel according to an exemplary embodiment of the present disclosure. FIG. 4B is a view selectively illustrating another portion of each component merely for the sake of convenience of explanation of a second external connection line and a connection pattern electrode of a touch screen panel according to an exemplary embodiment of the present disclosure. Therefore, redundant features of a part of FIG. 4A and a part of FIG. 4B may be omitted or repeated for the sake of convenience of explanation.

The plurality of second mesh pattern electrodes Rx_M is disposed in the fifth touch area TA5 to sense a touch operated by the touch driving unit.

Referring to FIGS. 2A and 4A, the plurality of second mesh pattern electrodes Rx_M extended in the first direction is disposed to be spaced apart from each other. Further, the second mesh pattern electrodes Rx_M extended in the first direction are disposed between the plurality of first mesh pattern electrodes Tx_M to be spaced apart from each other. That is, the second mesh pattern electrodes Rx_M and the first mesh pattern electrodes Tx_M may be alternately arranged on different layers along the second direction.

The second mesh pattern electrodes Rx_M as illustrated in FIG. 4A extended in one direction, but the present disclosure is not limited thereto and various types of mesh pattern electrode may be formed.

The plurality of second internal connection lines Rx_L1 electrically interconnects the plurality of second mesh pattern electrodes Rx_M spaced apart from each other to effectively transmit a touch signal between the second mesh pattern electrodes Rx_M spaced apart from each other.

Specifically, the plurality of second internal connection lines Rx_L1, is extended in the second direction, and is disposed between the plurality of first internal connection lines Tx_L1 spaced apart from each other. Thereby, electrically interconnecting the plurality of second mesh pattern electrodes Rx_M extended in the first direction to each other. As the plurality of second internal connection lines Rx_L1 extend in the second direction, the plurality of second internal connection lines Rx_L1 may overlap with portions of the first mesh pattern electrodes Tx_M with the insulating layer therebetween.

By doing this, the touch signal may be effectively shared or distributed by all of the plurality of second mesh pattern electrodes Rx_M.

Further, even though the second internal connection lines Rx_L1 may be formed in various patterns, such as a zigzag pattern, the second internal connection lines may be a straight line extended in the second direction. The plurality of second internal connection lines Rx_L1 is formed to be a straight line so that resistance of the second internal connection lines Rx_L1 may be reduced. By doing this, the touch signal applied through the second internal connection lines Rx_L1 is effectively transmitted so that a response speed of the touch screen panel 113 may be improved.

However, the second internal connection lines Rx_L1 is illustratively expressed as a straight line, but is not limited thereto and may be configured in a pattern which is not a straight line. The second internal connection lines Rx_L1 may be formed along banks between the plurality of sub-pixels R, G, and B in a direction parallel to the second external connection lines Rx_L2.

In other words, in order to form the second internal connection lines Rx_L1 to be a straight line, a shape of the sub-pixels may be modified. For example, in order to form the second internal connection lines Rx_L1 to be a straight line, shapes of the sub-pixels R and G located on both sides of the second internal connection lines Rx_L1 may be designed in the form of facing triangles. Here, the shapes of the sub-pixels R and G may be triangles and one sides of the triangles are parallel to each other with respect to the Second internal connection lines Rx_L1.

In some exemplary embodiments, the first mesh pattern electrodes Tx_M including a plurality of rhombic patterns sequentially connected to each other along the first direction and the second mesh pattern electrodes Rx_M including a plurality of rhombic pattern sequentially connected to each other along the first direction are alternately disposed in the second direction. The first straight internal connection lines Tx_L1 extended in the second direction and the second straight internal connection lines Rx_L1 extended in the second direction are alternately arranged in the first direction, but the arrangement is not limited thereto. According to the above-described configuration, the resistance of the touch sensor TS may be minimized by the straight internal connection lines Tx_L1 and Rx_L1 and the touch sensitivity may be improved by the mesh pattern electrode.

Referring to FIG. 4B, the plurality of second external connection lines Rx_L2 serves to connect the second mesh pattern electrode Rx_M of the touch sensor TS with an external component.

That is, the plurality of second external connection line Rx_L2 interconnects the plurality of second mesh pattern electrodes Rx_M to another touch sensor TS adjacent thereto. For example, the plurality of second external connection line Rx_L2 connects the plurality of second mesh pattern electrodes Rx_M to the first to third routing lines RL1, RL2, and RL3.

Specifically, the plurality of second external connection line Rx_L2 with respect to the third touch sensor TS3 illustrated in FIG. 1 will be described. The plurality of second external connection lines Rx_L2 disposed in the fourth touch area TA4 of the third touch sensor TS3 is connected to the second touch sensor TS2 disposed at a left side of the third touch sensor TS3. The plurality of second external connection line Rx_L2 disposed in the sixth touch area TA6 of the third touch sensor TS3 is connected to the first routing line RL1 disposed at a right side of the third touch sensor TS3.

Here, even though the second external connection lines Rx_L2 may also be formed in various patterns, such as a zigzag pattern, the second external connection lines may be a straight line extended in the second direction. The plurality of second external connection lines Rx_L2 is formed to be a straight line so that resistance of the second external connection lines Rx_L2 may be reduced. By doing this, the touch signal applied through the second external connection lines Rx_L2 is effectively transmitted so that a response speed of the touch screen panel 113 may be improved.

However, the second external connection lines Rx_L2 are illustratively expressed as straight lines, but the present disclosure is not limited thereto and the second external connection lines Rx_L2 may be configured in a pattern which is not a straight line. The second external connection lines Rx_L2 may be formed along banks between the plurality of sub-pixels R, G, and B in a direction intersecting the first external connection lines Tx_L2.

The exemplary mesh type connection pattern electrode Rx_C is extended in the first direction to be electrically connected to the second external connection line Rx_L2 extended in the second direction. Further, the exemplary mesh type connection pattern electrode Rx_C is electrically connected to the second mesh pattern electrode Rx_M and the second internal connection line Rx_L1 formed of a second layer. Therefore, the exemplary mesh type connection pattern electrode Rx_C may electrically connect the second internal connection line Rx_L1 and the second external connection line Rx_L2 together. The mesh type connection pattern electrode Rx_C may be disposed adjacent to an outermost first mesh pattern electrode Tx_M.

As illustrated in FIG. 4B, the connection pattern electrode Rx_C may be a mesh pattern overlapping an outermost second mesh pattern electrode Rx_M, but is not limited thereto, and may have various shapes such as a straight line or a zigzag pattern. In addition, the connection pattern electrode Rx_C may be overlapped with one second mesh pattern electrode Rx_M among the plurality of second mesh pattern electrodes Rx_M. Further, the connection pattern electrode Rx_C may be overlapped with a second mesh pattern electrode Rx_M positioned at the outer side among the plurality of second mesh pattern electrodes Rx_M, but the present disclosure is not limited thereto.

Further, the plurality of second mesh pattern electrodes Rx_M, the second internal connection lines Rx_L1, the connection pattern electrodes Rx_C, and the second external connection lines Rx_L2 which configure the second touch electrode unit Rx may be formed of a metal having a high electric conductivity. For example, the plurality of second mesh pattern electrodes Rx_M, the second internal connection lines Rx_L1, the connection pattern electrodes Rx_C, and the second external connection lines Rx_L2 which configure the second touch electrode unit Rx may be formed of a single layer or multiple layers formed of aluminum (Al), copper (Cu), molybdenum (Mo), chrome (Cr), gold (Au), titanium (Ti), nickel (Ni), neodymium (Nd), or an alloy thereof. As described above, the second touch electrode unit Rx is formed of the metal having excellent electric conductivity so that a touch signal for driving the touch screen panel 113 may be quickly transmitted from the external touch driving unit to the second touch electrode unit Rx. Since the touch signal transmitting speed is improved, the touch driving unit may quickly sense the touch operation of the user so that the response speed of the touch screen panel 113 may be improved.

Figure 5:
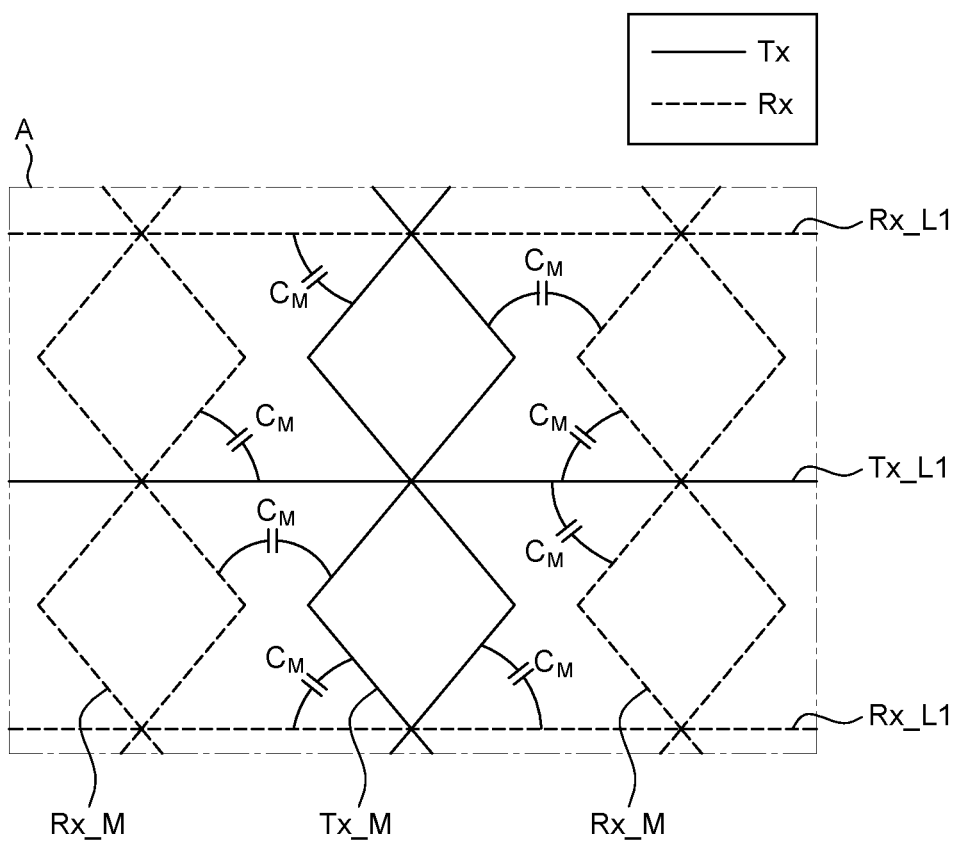
FIG. 5 is an enlarged view of an A area illustrated in FIG. 2A according to an embodiment of the present disclosure.

FIG. 5 is an enlarged view of an A area illustrated in FIG. 2A.

As described above, the first touch electrode unit Tx and the second touch electrode unit Rx are electrically separated.

Accordingly, as illustrated in FIG. 5, a mutual capacitance $C_M$ between the first mesh pattern electrode Tx_M and the second mesh pattern electrode Rx_M, a mutual capacitance $C_M$ between the first mesh pattern electrode Tx_M and the second internal connection line Rx_L1, a mutual capacitance $C_M$ between the first internal connection line Tx_L1 and the second mesh pattern electrode Rx_M, and a mutual capacitance $C_M$ between the first internal connection line Tx_L1 and the second internal connection line Rx_L1 can be generated.

The first touch electrode unit Tx and the second touch electrode unit Rx are disposed to intersect each other in the fifth touch area TA5 which is a sensing area so that the mutual capacitance $C_M$ for touch sensing may be maximized.

In contrast, the first to third touch areas TA1 to TA3 and fourth area TA4 and sixth area TA6 and the seventh to ninth touch areas TA7 to TA9 may be regarded as non-touch sensing areas. Therefore, unnecessary parasitic capacitances that can be generated internally or externally with respect to the touch screen panel 133 may be reduced. Therefore, an unnecessary load of the touch screen panel 110 can be minimized so that the touch response speed of the touch screen panel 113 may be improved.

Figure 6A:
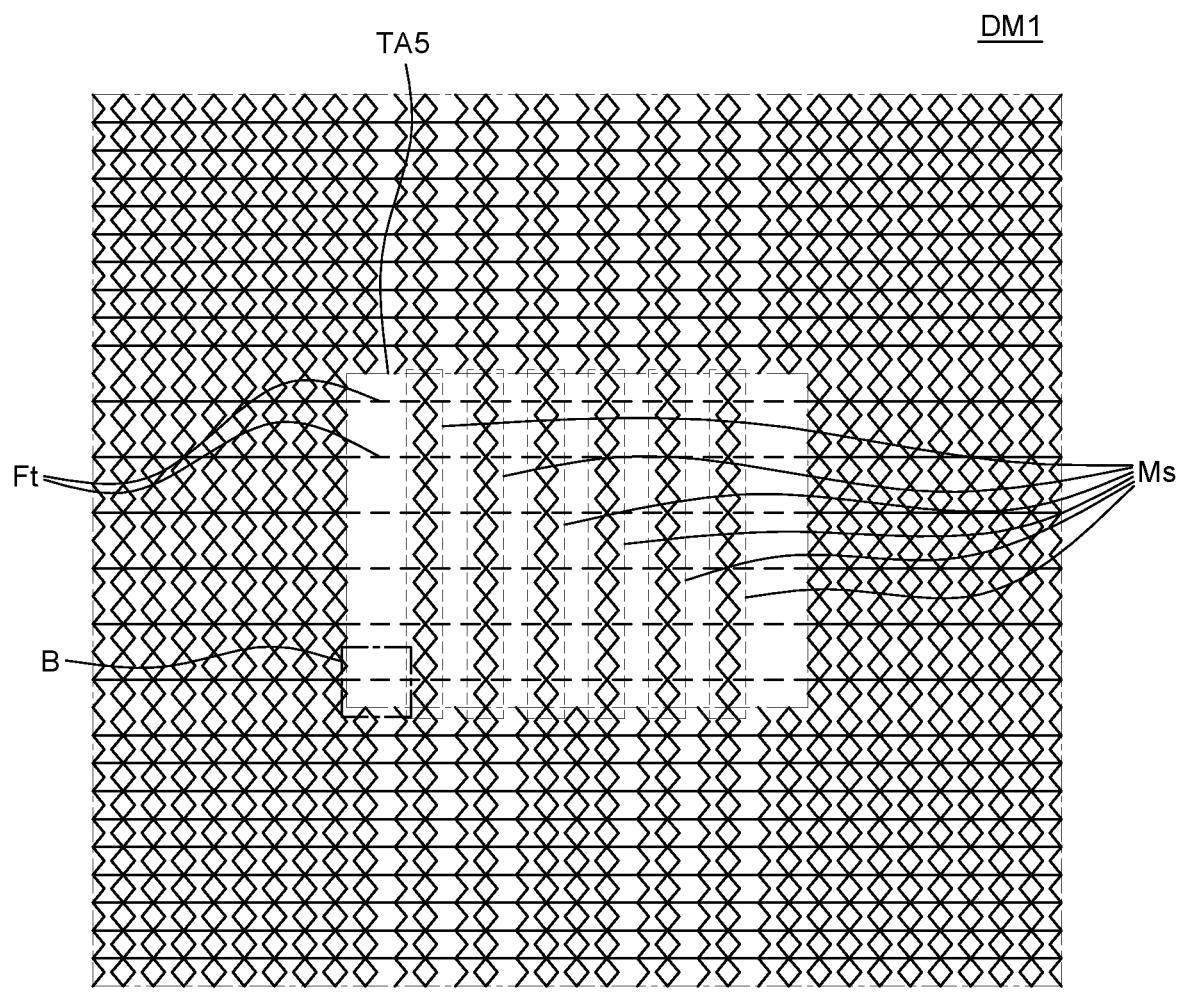
FIGS. 6A and 6B are views for explaining a first dummy electrode unit and a second dummy electrode unit of a touch screen panel according to an exemplary embodiment of the present disclosure.
Figure 6B:
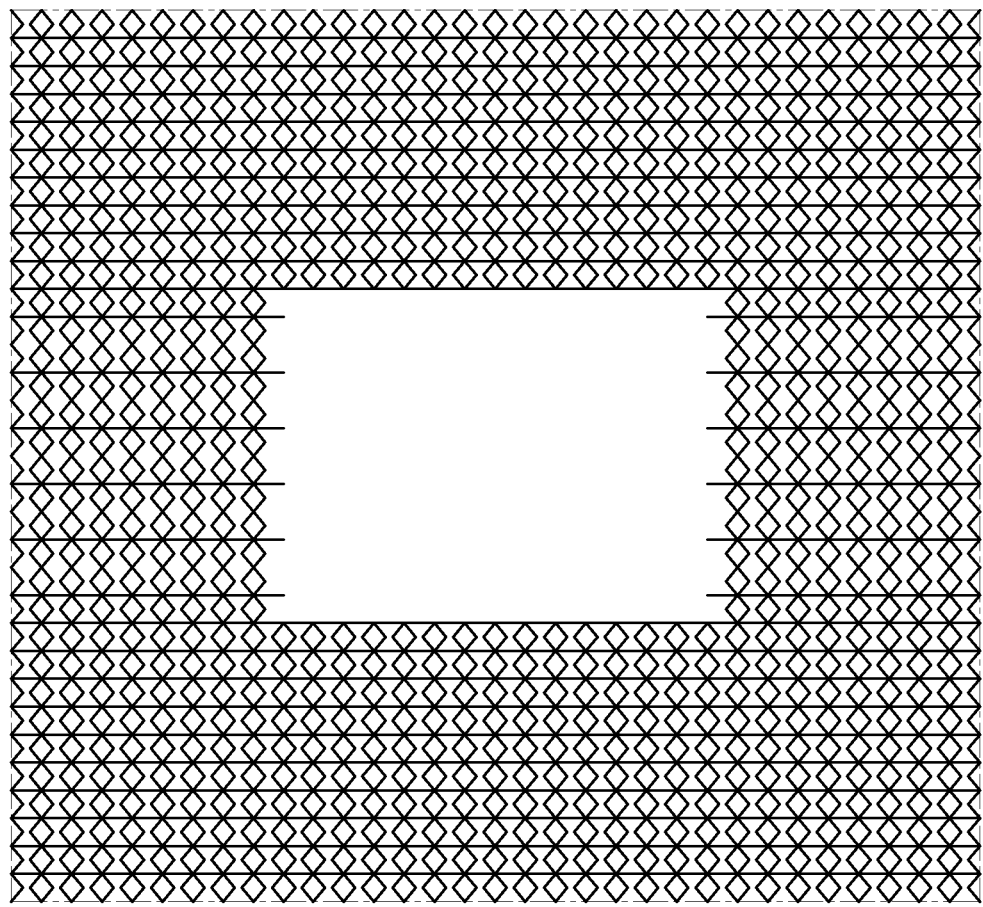

FIGS. 6A and 6B are views for illustrating a first dummy electrode unit and a second dummy electrode unit of a touch screen panel according to some embodiments of the present disclosure.

In some embodiments, at least one touch sensor TS among a plurality of touch sensors of the touch screen panel 113 may further include a first dummy electrode unit DM1 and a second dummy electrode unit DM2. But the present disclosure is not limited thereto, and each dummy electrode unit may be selectively included according to its size, application and the like.

Each of the first dummy electrode unit DM1 and the second dummy electrode unit DM2 may include a plurality of mesh pattern electrodes and at least one floating electrode formed over the first touch area TA to ninth touch area TA.

That is, each of the first dummy electrode unit DM1 and the second dummy electrode unit DM2 may include some mesh pattern electrodes and some floating electrodes. The dummy electrode units may be formed in an entire area of the first touch sensor TS1 excluding an area including the first touch electrode unit Tx and the second touch electrode unit Rx.

Referring to FIG. 6A, the first dummy electrode unit DM1 may be formed of the first layer. The first dummy electrode unit DM1 may include the third mesh pattern electrode Ms and the floating electrode Ft. The first dummy electrode unit DM1 is configured to be excluded in an area where the plurality of first mesh pattern electrode Tx_M, the first internal connection lines Tx_L1, the first external connection lines Tx_L2 which configure the first touch electrode unit Tx and the second external connection lines Rx_L2, and the connection pattern electrodes Rx_C of the second touch electrode unit Rx are disposed.

The fifth touch area TA5 which is a sensing area will be mainly described for the sake of convenience of explanation. The first dummy electrode unit DM1 may include a third mesh pattern electrode Ms overlapping the second mesh pattern electrode Rx_M and a floating electrode Ft overlapping the second internal connection line Rx_L1. That is, the third mesh pattern electrode Ms and the floating electrode Ft disposed on the first layer overlap the second mesh pattern electrode Rx_M and the second internal connection line Rx_L1 disposed on the second layer, respectively. As shown in FIG. 6A, the plurality of floating electrodes Ft may be disposed between the first mesh pattern electrodes Tx_M and the second mesh pattern electrodes Rx_M. The floating electrodes Ft may also be disposed between the first mesh pattern electrodes Tx_M and the mesh type connection pattern electrodes Rx_C. The floating electrodes Ft may be in a same layer as the first mesh pattern electrodes Tx_M.

Here, for the convenience of description, one floating electrode Ft is illustrated, but a plurality of floating electrodes Ft may be separately arranged, which will be described below.

Referring to FIG. 6B, the second dummy electrode unit DM2 may include a mesh pattern electrode formed on the second layer in an area excluding an area where the second mesh pattern electrode Rx_M and the second internal connection line Rx_L1 of the second touch electrode unit Rx are disposed.

Here, the third mesh pattern electrode Ms of the second dummy electrode unit DM2 may have a pattern having substantially the same size and substantially the same shape as the first mesh pattern electrode Tx_M and the second mesh pattern electrode Rx_M as described above. Further, a width of at least one floating electrode Ft may be equal to or smaller than a width of the second internal connection line Rx_L1, but is not limited thereto.

As described above, in the touch screen panel 113 according to the exemplary embodiment of the present disclosure, the first dummy electrode unit DM1 and the second dummy electrode unit DM2 are formed. Accordingly, various electrodes having substantially the same shape of mesh pattern to each other may be formed on the entire area of the first touch sensor TS1 including the first to ninth touch areas TA1 to TA9. Accordingly, various mesh pattern electrodes are arranged in the first touch sensor TS1 of the touch screen panel 113 such that particular patterns of the electrodes may not be perceived by a user with respect to the first touch sensor TS1.

Further, the first dummy electrode unit DM1 and the second dummy electrode unit DM2 of the touch screen panel 113 may be coupled by a touch signal to perform the same function as the first touch electrode unit Tx. Consequently, the mutual capacitance $C_M$ is additionally generated due to the first dummy electrode unit DM1 and the second dummy electrode unit DM2. Therefore, the touch sensitivity of the touch screen panel 113 may be improved.

Further, the first dummy electrode unit DM1 of the touch screen panel 113 includes the floating electrode Ft so that dielectric breakdown of the first touch electrode unit Tx and the second touch electrode Rx may be suppressed or may be protected.

Figure 7:
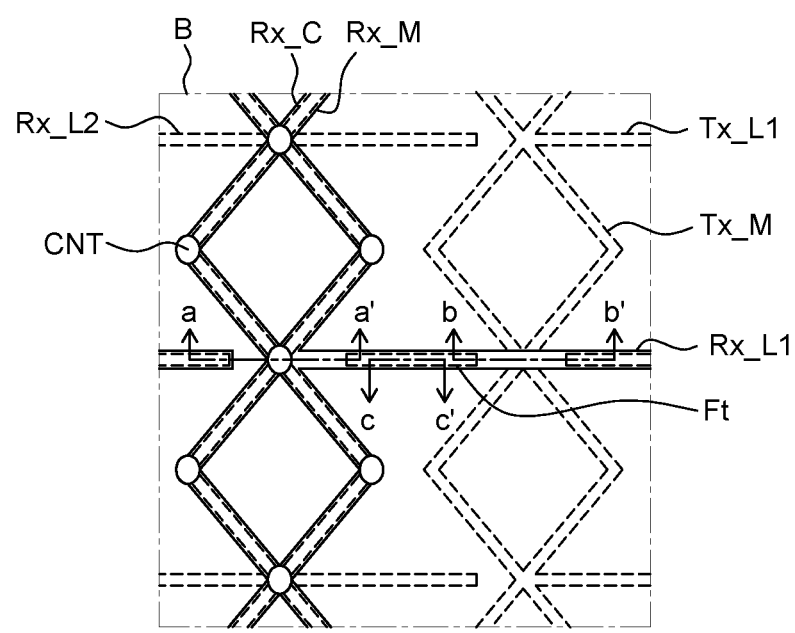
FIG. 7 is an enlarged view of a B area illustrated in FIGS. 2A and 6A according to an embodiment of the present disclosure.
Figure 8A:
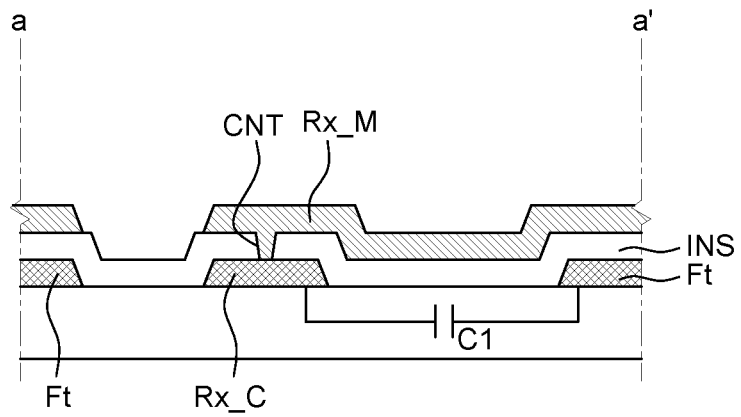
FIG. 8A is a cross-sectional view taken along the line a-a' of FIG. 7
Figure 8B:
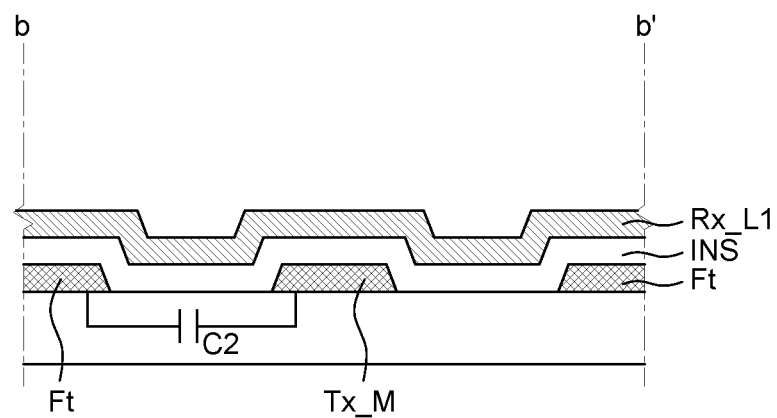
FIG. 8B is a cross-sectional view taken along the line b-b' of FIG. 7 according to an embodiment of the present disclosure.

FIG. 7 is an enlarged view of a B area illustrated in FIGS. 2A and 6A, FIG. 8A is a cross-sectional view taken along the line a-a' of FIG. 7, and FIG. 8B is a cross-sectional view taken along the line b-b' of FIG. 7 according to an embodiment.

As illustrated in FIG. 7, the second external connection line Rx_L2, the connection pattern electrode Rx_C, the first mesh pattern electrode Tx_M, the first internal connection line Tx_L1, and the floating electrode Ft represented by the dotted line are formed of the first layer and the second mesh pattern Rx_M and the second internal connection line Rx_L1 represented by the solid line are formed of the second layer.

The connection pattern electrode Rx_C and the second mesh pattern electrode Rx_M formed by different layers are electrically connected through a plurality of contact holes CNT.

Specifically, as illustrated in FIG. 8A, an insulating layer INS is formed between the first layer including the floating electrode Ft and the connection pattern electrode Rx_C and the second layer including the second mesh pattern electrode Rx_M. The connection pattern electrode Rx_C and the second mesh pattern electrode Rx_M formed on different layers are electrically connected through at least one contact hole CNT formed in the insulating layer INS. By doing this, the second mesh pattern electrode Rx_M may be connected to the second external connection line Rx_L2 through at least one contact hole CNT.

Further, as illustrated in FIG. 8B, the floating electrode Ft and the first mesh pattern electrode Tx_M formed of the first layer are physically spaced apart from each other and the insulating layer INS is disposed to cover the space. Moreover, the floating electrode Ft may be disposed adjacent to the portion of the first mesh pattern electrode Tx_M that overlaps with the second internal connection lines Rx_L1. Specifically, the floating electrode Ft may be disposed between the overlapping portion of the first mesh pattern electrode Tx_M and the second mesh pattern electrode Rx_M or the mesh type connection pattern electrode Rx_C. The second internal connection line Rx_L1 is formed on the insulating layer INS.

The interlayer structure of the touch screen panel 113 may be summarized as follows: the plurality of first mesh pattern electrodes Tx_M, the first internal connection lines Tx_L1, and the first external connection lines Tx_L2 which configure the first touch electrode unit Tx, the second external connection lines Rx_L2 and the connection pattern electrodes Rx_C of the second touch electrode unit Rx, and the floating electrode Ft of the first dummy electrode unit DM1 are formed of the first layer. The second mesh pattern electrode Rx_M, the second internal connection line Rx_L1 of the second touch electrode unit Rx, and the second dummy electrode unit DM2 are formed of the second layer which is different from the first layer.

The insulating layer INS is disposed between the first layer and the second layer for electrical insulation. However, the second mesh pattern electrode Rx_M, the second internal connection line Rx_L1, the second external connection line Rx_L2, and the connection pattern electrode Rx_C of the second touch electrode unit Rx are electrically connected to each other through the plurality of contact holes CNT formed in the insulating layer INS. Therefore, the first touch electrode unit Tx and the second touch electrode unit Rx are electrically insulated. In addition, due to the presence of the floating electrodes Ft, the insulating layer INS, as well as the second internal connection lines Rx_L1 disposed on the insulating layer INS, may have a concave shape toward the substrate in an area between the first mesh pattern electrode Tx_M and the floating electrode Ft.

FIGS. 9A to 9D are cross-sectional views taken along the line c-c' of FIG. 7. FIGS. 9A to 9D show four exemplary embodiments of a first dummy electrode unit DM1.

Figure 9A:
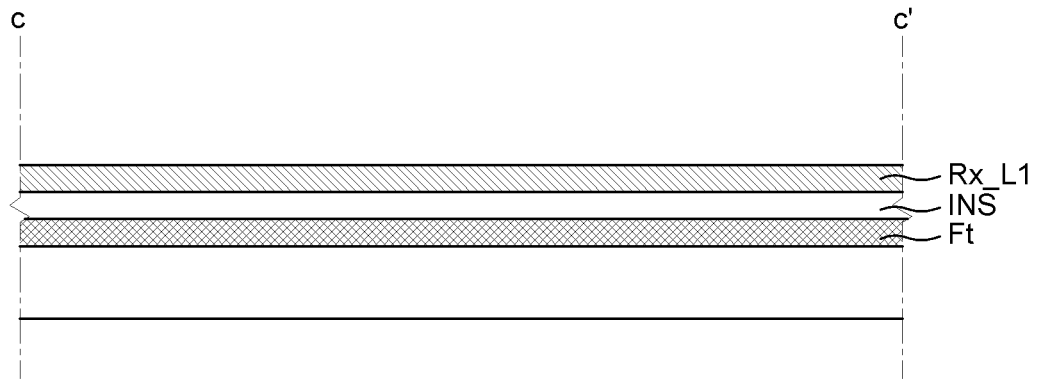
FIGS. 9A to 9D are cross-sectional views taken along the line c-c' of FIG. 7 according to an embodiment of the present disclosure.
Figure 9B:
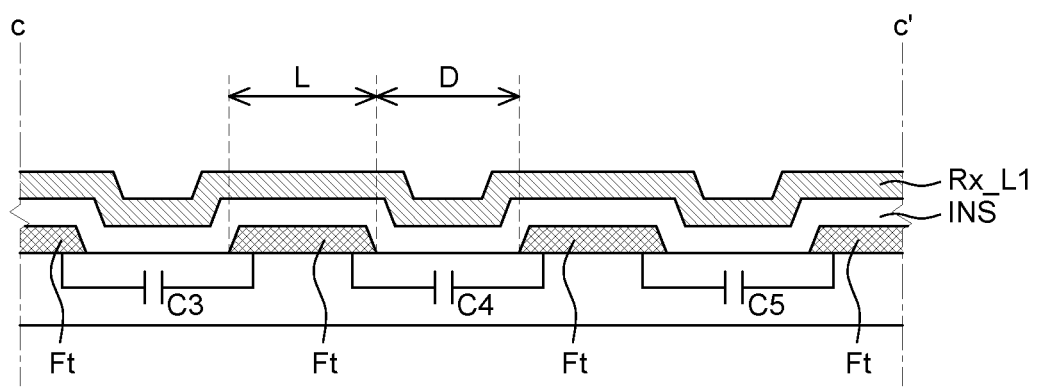
Figure 9C:
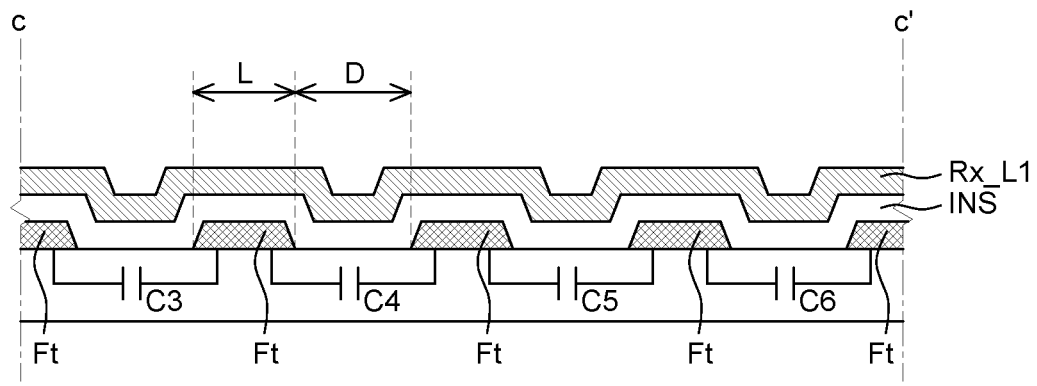
Figure 9D:
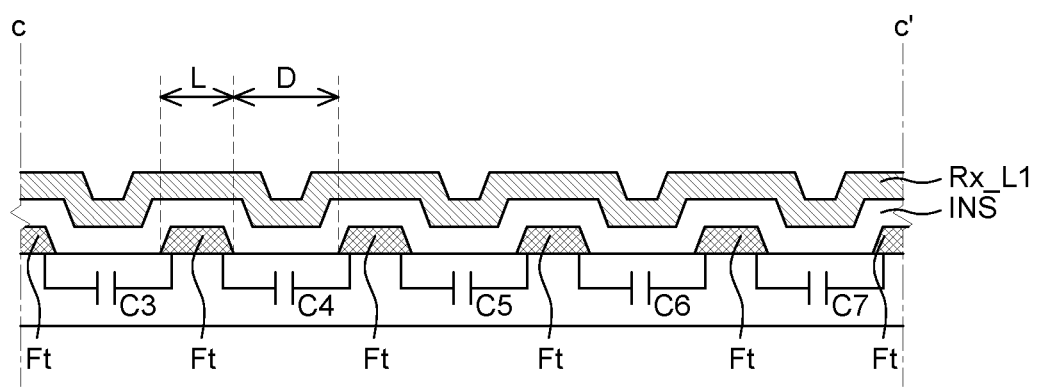

Specifically, FIG. 9A illustrates that the first dummy electrode unit DM1 including one floating electrode Ft, FIG. 9B illustrates that the first dummy electrode unit DM1 including four floating electrodes Ft, FIG. 9C illustrates that the first dummy electrode unit DM1 including five floating electrodes Ft, and FIG. 9D illustrates that the first dummy electrode unit DM1 including six floating electrodes Ft.

Referring to FIG. 8A, FIG. 8B, and FIG. 9A, the first dummy electrode unit DM1 includes one floating electrode Ft. Therefore, a capacitance Total C generated by the floating electrode Ft includes a first capacitance C1 and a second capacitance C2.

Here, the first capacitance C1 refers to a capacitance between the floating electrode Ft and the connection pattern electrode Rx_C, as illustrated in FIG. 8A. Further, the second capacitance C2 refers to a capacitance between the floating electrode Ft and the first mesh pattern electrode Tx_M, as illustrated in FIG. 8B.

TABLE 1

|  | Reference | Case 1 | |
|---|---|---|---|
| # Ft | 0 | 1 | |
| L (um) | 125.6 | 114.9 | |
| Classification | C1 | C1 | C2 |
| D (um) | 9.3 | 10 | 10 |
| C (aF) | 7.74 | 7.19 | 7.19 |
| Total C (aF) | 7.74 | 3.60 | |

Referring to Table 1, when a length of one floating electrode Ft in the second direction is 114.9 μm and both a distance D between the floating electrode Ft and the connection pattern electrode Rx_C and a distance D between the floating electrode Ft and the first mesh pattern electrode Tx_M are 10 μm, both the first capacitance C1 and the second capacitance C2 are 7.19 aF. Therefore, the capacitance Total C formed between the first mesh pattern electrode Tx_M and the connection pattern electrode Rx_C is 3.60 aF.

For a comparison, a reference touch screen panel excluding a floating electrode, but including an extended portion of the connection pattern electrode Rx_C in the second direction by a predetermined length L, for example, 125.6 μm, to have a straight line pattern which is spaced apart from the first mesh pattern electrode Tx_M by a predetermined distance D, for example, 9.3 μm. The capacitance Total C generated between the first mesh pattern electrode Tx_M and the connection pattern electrode Rx_C of the reference touch screen panel is 7.74 aF.

Accordingly, the touch screen panel 113 according to the exemplary embodiment of the present disclosure includes the floating electrode Ft so that the capacitance Total C formed between the first mesh pattern electrode Tx_M and the connection pattern electrode Rx_C is significantly reduced. Therefore, as it will be described below, a quantity of charges induced in the first mesh pattern electrode Tx_M and the connection pattern electrode Rx_C is reduced so that a potential difference between the second internal connection line Rx_L1 which is electrically connected to the connection pattern electrode Rx_C and the first mesh pattern electrode Tx_M is reduced. Therefore, the dielectric breakdown can be suppressed.

Next, referring to FIG. 9B, the first dummy electrode unit DM1 includes four floating electrodes Ft. Therefore, a capacitance Total C generated by the floating electrodes Ft includes a first capacitance C1 to a fifth capacitance C5.

Here, the first capacitance C1 and the second capacitance C2 correspond to those described above and third to fifth capacitances C3, C4, and C5 refer to capacitances between four floating electrodes Ft.

TABLE 2

| | Case 2 | | | | |
|---|---|---|---|---|---|
| # Ft | 4 | | | | |
| L (um) | 15.0 | | | | |
| Classification | C1 | C2 | C3 | C4 | C5 |
| D (um) | 15 | 15 | 15 | 15 | 15 |
| C (aF) | 4.80 | 4.80 | 4.80 | 4.80 | 4.80 |
| Total C (aF) | | | 0.959 | | |

Referring to Table 2, when lengths of the four floating electrodes Ft in the second direction are 15 μm and all distances D between four floating electrodes Ft are 15 μm, all the first capacitance C1 to fifth capacitance C5 are 4.80 aF. Therefore, the capacitance Total C formed between the first mesh pattern electrode Tx_M and the connection pattern electrode Rx_C is 0.959 aF.

Next, referring to FIG. 9C, the first dummy electrode unit DM1 includes five floating electrodes Ft. Therefore, a capacitance Total C generated by the floating electrodes Ft includes a first capacitance C1 to a sixth capacitance C6.

Here, the first capacitance C1 and the second capacitance C2 correspond to those described above and third to sixth capacitances C3, C4, C5, and C6 refer to capacitances between five floating electrodes Ft.

TABLE 3

| | Case 3 | | | | | |
|---|---|---|---|---|---|---|
| # Ft | 5 | | | | | |
| L (um) | 12.0 | | | | | |
| Classification | C1 | C2 | C3 | C4 | C5 | C6 |
| D (um) | 12.5 | 12.5 | 12.5 | 12.5 | 12.5 | 12.5 |
| C (aF) | 5.76 | 5.76 | 5.76 | 5.76 | 5.76 | 5.76 |
| Total C (aF) | | | 0.959 | | | |

Referring to Table 3, when lengths of the five floating electrodes Ft in the second direction are 12 μm and all distances D between five floating electrodes Ft are 12.5 μm, all the first capacitance C1 to sixth capacitance C6 are 5.76 aF. Therefore, the capacitance Total C formed between the first mesh pattern electrode Tx_M and the connection pattern electrode Rx_C is 0.959 aF.

Next, referring to FIG. 9D, the first dummy electrode unit DM1 includes six floating electrodes Ft. Therefore, a capacitance Total C generated by the floating electrodes Ft includes a first capacitance C1 to a seventh capacitance C7.

Here, the first capacitance C1 and the second capacitance C2 are as described above and third to seventh capacitances C3, C4, C5, C6, and C7 refer capacitances between six floating electrodes Ft.

TABLE 4

| | Case 4 | | | | | | |
|---|---|---|---|---|---|---|---|
| # Ft | | | | 6 | | | |
| L (um) | | | | 10.8 | | | |
| Classification | C1 | C2 | C3 | C4 | C5 | C6 | C7 |
| D (um) | 10 | 10 | 10 | 10 | 10 | 10 | 10 |
| C (aF) | 7.19 | 7.19 | 7.19 | 7.19 | 7.19 | 7.19 | 7.19 |
| Total C (aF) | | | | 1.028 | | | |

Referring to Table 4, when lengths of the six floating electrodes Ft in the second direction are 10.8 μm and all distances D between six floating electrodes Ft are 10 μm, all the first capacitance to the seventh capacitance C7 are 7.19 aF. Therefore, the capacitance Total C formed between the first mesh pattern electrode Tx_M and the connection pattern electrode Rx_C is 1.028 aF.

Figure 10A:
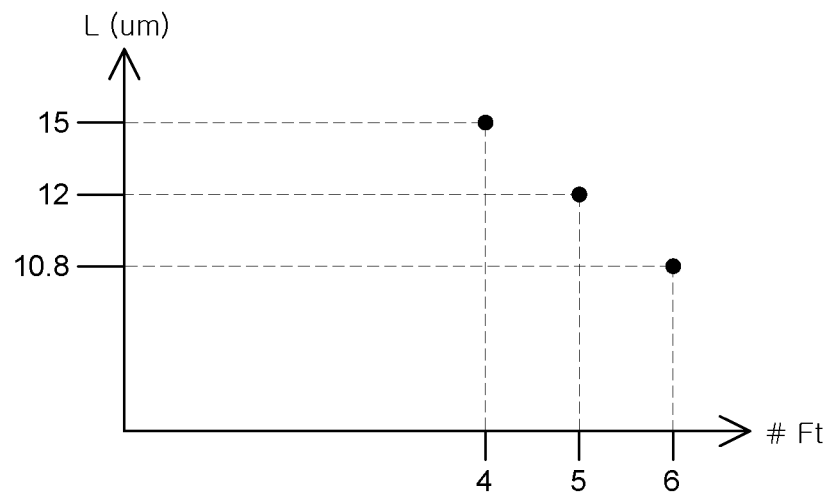
FIG. 10A is a graph illustrating a relationship of a number of floating electrodes and a length of the floating electrode.
Figure 10B:
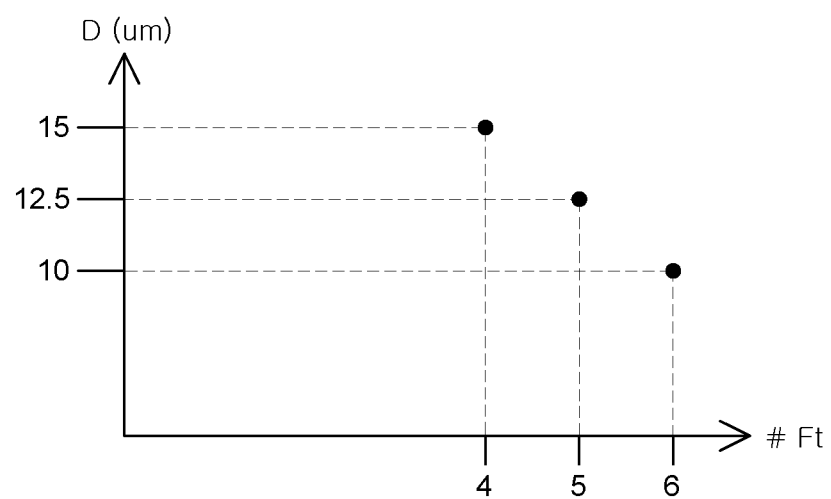
FIG. 10B is a graph illustrating a relationship of a number of floating electrodes and a distance between the floating electrodes.

FIG. 10A is a graph illustrating a relationship of a number of floating electrodes and a length of the floating electrode and FIG. 10B is a graph illustrating a relationship of a number of floating electrodes and a distance between the floating electrodes.

Referring to FIG. 10A, when the first dummy electrode unit DM1 includes four floating electrodes Ft, the length L of the floating electrode Ft in the second direction is 15 μm. When the first dummy electrode unit DM1 includes five floating electrodes Ft, the length L of the floating electrode Ft in the second direction is 12 μm. When the first dummy electrode unit DM1 includes six floating electrodes Ft, the length L of the floating electrode Ft in the second direction is 10.8 μm.

That is, as the number of floating electrodes Ft disposed between the first mesh pattern electrode Tx_M and the connection pattern electrode Rx_C is increased, the length L of the floating electrode Ft is reduced.

Referring to FIG. 10b, when the first dummy electrode unit DM1 includes four floating electrodes Ft, the distance D between the floating electrodes Ft is 15 μm. When the first dummy electrode unit DM1 includes five floating electrodes Ft, the distance D between the floating electrodes Ft is 12.5 μm. When the first dummy electrode unit DM1 includes six floating electrodes Ft, the distance D between the floating electrodes Ft is 10 μm.

That is, as the number of floating electrodes Ft disposed between the first mesh pattern electrode Tx_M and the connection pattern electrode Rx_C is increased, the distance between the floating electrodes Ft is also reduced.

As a result, the larger the number of floating electrodes Ft disposed between the first mesh pattern electrode Tx_M and the connection pattern electrode Rx_C, the shorter the length L of one floating electrode Ft and the distance D between the floating electrodes Ft. However, a sum of the lengths L of all the floating electrodes Ft and a sum of the distances D between all the floating electrodes Ft may be maintained.

Accordingly, even though the floating electrode Ft is divided into a plurality of floating electrodes, the sum of the lengths L of all the floating electrodes Ft and the sum of the distances D between all the floating electrodes Ft may be maintained. Therefore, the capacitance Total C between the first mesh pattern electrode Tx_M and the connection pattern electrode Rx_C may be maintained to be approximately 1 aF. Even though the floating electrode Ft is divided into a plurality of floating electrodes, only when the sum of the lengths L of all the floating electrodes Ft may be maintained, the reflectance of the floating electrode Ft and the reflectance of the first external connection line Rx_L2 adjacent to the floating electrode Ft in the first direction of the floating electrode Ft may be similarly maintained. Therefore, a specific pattern due to the first dummy electrode unit DM1 of the touch screen panel 113 may not be perceived by the viewer. That is, the visibility of the touch screen panel 113 can be improved.

In addition, it should be noted that when the sum of the lengths L of all the floating electrodes Ft and the sum of the distances D between all the floating electrodes Ft are maintained, the effects of suppressing a dielectric breakdown of the insulating layer INS can be provided.

Accordingly, a touch screen panel 113 including a plurality of floating electrodes, arranged along a particular direction, spaced apart from each other with a particular distance provided between mesh pattern electrodes may suppress a dielectric breakdown of the insulating layer INS of the touch screen panel 113.

In summary, at least one floating electrode Ft is formed between the first mesh pattern electrode Tx_M and the connection pattern electrode Rx_C so that a capacitance formed between the first mesh pattern electrode and the connection pattern electrode may be reduced. In other words, at least one floating electrode positioned between mesh pattern electrodes is configured to be overlapped with a corresponding connection line extended in parallel with the at least one floating electrode can be provided to improve the dielectric breakdown protection ability.

In addition, the number of a plurality of floating electrodes and/or the distance between a plurality of floating electrodes may be determined in consideration of the desired parasitic capacitance value, the desired reflectance characteristics, its screen size, and/or its application such as indoor application or outdoor application. Thereby, providing an adequate parasitic value and an adequate reflectance value.

Therefore, a quantity of charges induced between the first mesh pattern electrode Tx_M and the connection pattern electrode Rx_C is reduced so that a potential difference between the second internal connection line Rx_L1 which is electrically connected to the connection pattern electrode Rx_C and the first mesh pattern electrode Tx_M is reduced.

Accordingly, it is possible to suppress induced current from flowing in the second internal connection line Rx_L1 and the first mesh pattern electrode Tx_M to suppress dielectric breakdown due to deterioration, thereby improving reliability of a touch screen panel.

Hereinafter, a display device including the above-described touch screen panel according to an exemplary embodiment of the present disclosure will be described. Even though a duplicated description of the above-described touch screen panel according to an exemplary embodiment of the present disclosure will be omitted, the display device including the touch screen panel according to the exemplary embodiment of the present disclosure includes all the technical features of the above-described touch screen panel according to the exemplary embodiment of the present disclosure.

Figure 11:
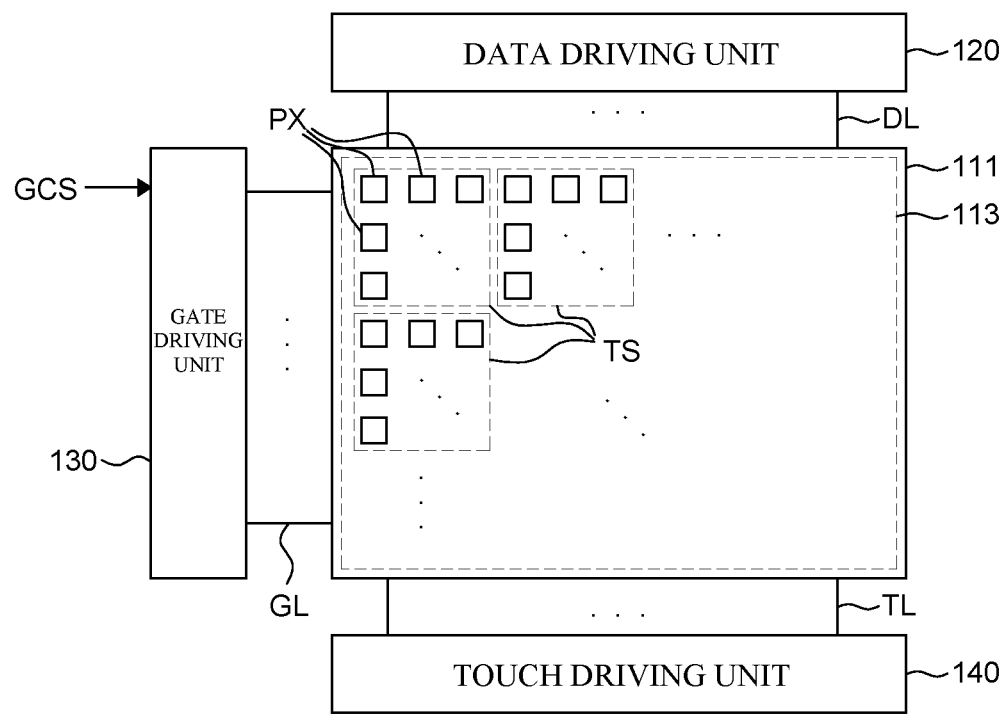
FIG. 11 is a schematic block diagram for explaining a display device including a touch screen panel according to an exemplary embodiment of the present disclosure.

FIG. 11 is a schematic block diagram for explaining a display device including a touch screen panel according to an exemplary embodiment of the present disclosure.

Referring to FIG. 11, a display device 100 includes a display panel 111, a touch screen panel 113, a data driving unit 120, a gate driving unit 130, and a touch driving unit 140.

The display panel 111 includes a substrate using glass or plastic and a plurality of gate lines GL and a plurality of data lines DL which intersect each other on the substrate. A plurality of pixels PX is defined at the intersections of the plurality of gate lines GL and the data lines DL. Each of the plurality of pixels PX of the display panel 111 includes at least one thin film transistor.

Further, when the display device 100 according to the exemplary embodiment of the present disclosure is an electroluminescent display device, current is applied to an electroluminescent diode equipped in the plurality of pixels PX and discharged electrons and holes are coupled to generate excitons. The excitons emit light to implement gray scale of the electroluminescent display device.

However, the display device 100 according to the exemplary embodiment of the present disclosure is not limited to the electroluminescent display device, but may be various types of display device such as a liquid crystal display device.

Figure 12:
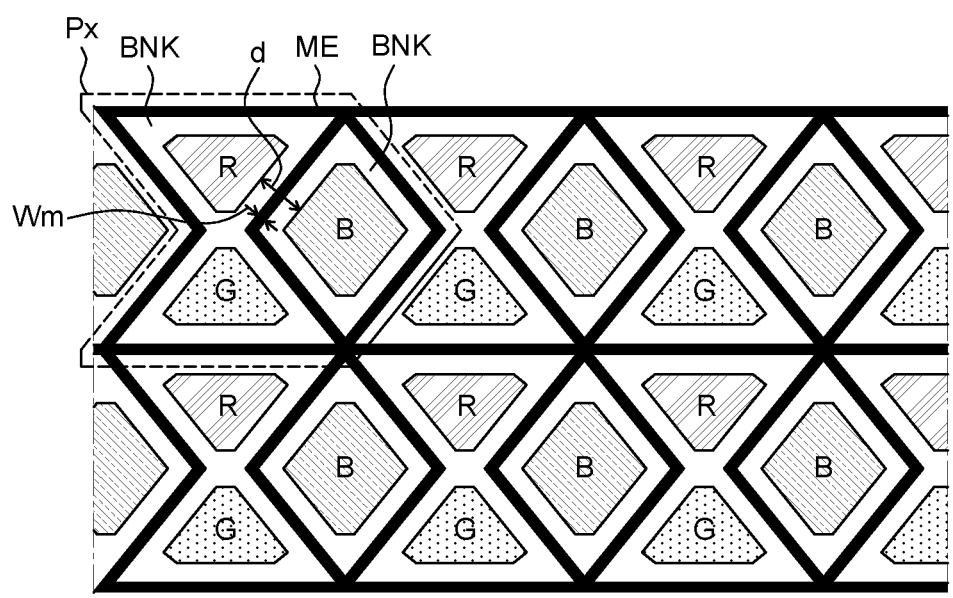
FIG. 12 is a view for explaining a pixel of a display device including a touch screen panel according to an exemplary embodiment of the present disclosure.

FIG. 12 is a view for explaining a pixel of a display device including a touch screen panel according to an exemplary embodiment of the present disclosure.

Referring to FIG. 12, the plurality of pixels PX includes a plurality of sub-pixels R, G, and B to implement light of a specific color. For example, the plurality of pixels PX may be configured by a red sub-pixel R which implements red, a green sub-pixel G which implements green, and a blue sub-pixel B which implements blue, but is not limited thereto.

The red sub-pixel R, the green sub-pixel G, and the blue sub-pixel B are enclosed by a bank BNK. That is, the red sub-pixel R, the green sub-pixel G, and the blue sub-pixel B are divided by a bank BNK. Cathodes are formed below the red sub-pixel R, the green sub-pixel G, and the blue sub-pixel B to drive the red sub-pixel R, the green sub-pixel G, and the blue sub-pixel B.

Here, shapes of the sub-pixels R, G, and B may be configured by a triangle or a rhombic shape in consideration of a performance of the touch sensor TS and a quality of an image. Therefore, it is adequate to simultaneously provide a zigzag shape electrode and a straight line electrode. But the shapes of the sub-pixels of the embodiments of the present disclosure are not limited thereto. The shapes of the sub-pixels R, G, and B are represented by a triangle or a rhombus are merely provided for an illustrative purpose for the sake of convenience of description. However, substantially, a corner thereof may be formed not to be sharp and each side may be formed to be curved, rather than a straight line.

In some embodiments, the shapes of the sub-pixels may be variously modified according to its application. Thus, the shapes of the first touch electrode unit and the second touch electrode unit may vary in accordance with the shapes of the sub-pixels. Further, the shapes of the first dummy electrode unit and the second dummy electrode unit may vary in accordance with the shapes of the sub-pixels. Further, all of the electrode units may be positioned on a bank between adjacent sub-pixels so as not to be overlapped with any sub-pixels. According to the above configuration, the electrode units may not obstruct viewing angle of the sub-pixels. Therefore, an image quality of the display panel corresponding to the touch screen panel 113 may not be deteriorated by the electrode units.

The touch screen panel 113 is bonded onto the display panel 111 to sense a touch input of the user. Specifically, the touch screen panel 113 includes a plurality of touch sensors TS and each touch sensor TS senses the touch of the user. Here, the touch sensor TS may be formed to have a size corresponding to a size of the plurality of pixels PX.

The touch sensor TS includes a first touch electrode unit Tx and a second touch electrode unit Rx and the first touch electrode unit Tx and the second touch electrode Rx are disposed on the bank BNK of the display panel 111.

For the convenience of description, the first touch electrode unit Tx and the second touch electrode unit Rx are unified as the mesh electrode ME and will be described below.

Here, the bank BNK does not emit light so that even though the mesh electrode ME, that is, the first touch electrode unit Tx and the second touch electrode Rx are disposed on the bank BNK, the transmittance of the display device 100 may not be substantially deteriorated.

The first touch electrode unit Tx and the second touch electrode unit Rx are disposed on the bank BNK so that red light, green light, and blue light emitted from the red sub-pixel R, the green sub-pixel G, and the blue sub-pixel B are not mixed.

That is, the mesh type first touch electrode unit Tx and second touch electrode unit Rx are disposed on the mesh type bank BNK so that the optical property of the display panel 111 may be improved.

A width Wm of the mesh electrode ME which configures the first touch electrode unit Tx and the second touch electrode unit Rx may be determined depending on a distance d between the sub-pixels R, G, and B and other sub-pixels R, G, and B adjacent thereto.

The touch sensor TS is connected to the touch driving unit 140 through a touch line TL connected to the first pad PAD1 and the second pad PAD2 of the touch screen panel 113. The touch driving unit 140 and the touch sensor TS are connected as described above to sense the touch of the user.

The touch driving unit 140 is connected to the touch sensor TS through the touch line TL to determine whether there is a touch of the user and a touch position. That is, when the user touches a partial area of the touch screen panel 113, the touch driving unit 140 senses a change of the capacitance of the touch sensor TS disposed in the touched partial area of the touch screen panel 113 to determine whether the user touches the touch screen panel 113 and the touch position.

Specifically, the touch driving unit 140 may transmit or receive a touch signal which is a specific level of a square wave through the touch sensor TS. The touch driving unit 140 senses a change $\Delta C$ of the capacitance of the touch sensor TS through the touch signal applied to the touch sensor TS. The touch driving unit 140 may sense the touch of the touch screen panel 113 through the above-described process. The method of sensing the touch using the touch sensor TS is classified into a mutual-capacitive manner which senses a change of the mutual-capacitance of the touch sensor and a self-capacitive manner which senses a change of the self-capacitance of the touch sensor.

The gate driving unit 130 sequentially supplies a gate voltage of an on-voltage or an off-voltage to the gate line GL in accordance with a gate control signal GCS output from a timing controller.

The gate control signal GCS includes a gate start pulse GSP, a gate shift clock GSC, and a gate output enable signal GOE.

Here, the gate start pulse controls an operation start timing of one or more gate circuits which configure the gate driving unit 130. The gate shift clock is a clock signal which is commonly input to one or more gate circuits and controls a shift timing of the scan signal (gate pulse). The gate output enable signal designates timing information of one or more gate circuits.

According to a driving method, the gate driving unit 130 may be located only at one side of the display panel 111 or located at both sides if necessary.

The gate driving unit 130 may include a shift register or a level shifter.

The data driving unit 120 converts image data received from the timing controller into an analog data voltage Vdata based on the data control signal DCS to output the image data to the data line DL.

Here, the data control signal DCS includes a source start pulse SSP, a source sampling clock SSC, and a source output enable signal SOE.

Here, the source start pulse controls a data sampling start timing of one or more data circuits which configure the data driving unit 120. The source sampling clock is a clock signal which controls a sampling timing of data in each data circuit. The source output enable signal controls an output timing of the data driving unit 120.

The data driving unit 120 is connected to the bonding pad of the display panel 111 by a tape automated bonding method or a chip on glass method or may be directly disposed on the display panel 111. If necessary, the data driving unit 120 may be integrated in the display panel 111.

The data driving unit 120 may include a logic unit including various circuits such as a level shifter or a latch unit, a digital analog converter DAC, and an output buffer.

As described above, the display device including the touch screen panel according to the exemplary embodiment of the present disclosure may form at least one floating electrode between a first mesh pattern electrode and a connection pattern electrode to reduce capacitance formed between the first mesh pattern electrode and the connection pattern electrode.

Therefore, a quantity of charges induced between the first mesh pattern electrode and the connection pattern electrode is reduced so that a potential difference between the second internal connection line which is electrically connected to the connection pattern electrode and the first mesh pattern electrode is reduced.

Accordingly, it is possible to suppress induced current from flowing in the second internal connection line and the first mesh pattern electrode to suppress dielectric breakdown due to deterioration, thereby improving reliability of a touch screen panel.

In some embodiments, the first connection line or the second connection line is formed to be a straight line.

In some embodiments, the first connection line or the second connection line is formed along banks between a plurality of sub-pixels R, G, and B of a display panel, shapes of the sub-pixels R and G located on both sides of the first connection line or the second connection line are designed in the form of facing triangles to form the first connection line or the second connection line to be a straight line.

In some embodiments, the touch screen panel further comprises a dummy electrode unit including a mesh pattern electrode disposed in non-touch sensing areas.

In some embodiments, the dummy electrode unit further includes a mesh pattern electrode disposed in a touch sensing area.

In some embodiments, the dummy electrode unit includes a first dummy electrode unit and a second dummy electrode unit disposed in different layers, and the first dummy electrode unit and the second dummy electrode unit are coupled by a touch signal.

In some embodiments, a sum of the lengths of the plurality of floating electrodes and a sum of the distances between the plurality of floating electrodes are maintained unchanged.

Embodiments also relate to a display device including the touch screen panel of any one of the above embodiments.

In some embodiments, the first connection line is formed to be a straight line.

In some embodiments, the first connection line is formed along banks between a plurality of sub-pixels R, G, and B of a display panel, shapes of the sub-pixels R and G located on both sides of the first connection line are designed in the form of facing triangles to form the first connection line to be a straight line.

In some embodiments, the touch screen panel further comprises a dummy electrode unit including a mesh pattern electrode disposed in non-touch sensing areas.

In some embodiments, the dummy electrode unit further includes a mesh pattern electrode disposed in a touch sensing area.

In some embodiments, the dummy electrode unit includes a first dummy electrode unit and a second dummy electrode unit disposed in different layers, and the first dummy electrode unit and the second dummy electrode unit are coupled by a touch signal.

In some embodiments, a sum of the lengths of the plurality of portions and a sum of the distances between the plurality of portions are maintained unchanged.

Embodiments also relate to a display device including the touch screen panel of any one of the above embodiments.

In some embodiments, the display device further comprises a dummy electrode unit including a mesh pattern electrode disposed in non-touch sensing areas.

In some embodiments, the dummy electrode unit further includes a mesh pattern electrode disposed in a touch sensing area.

In some embodiments, the dummy electrode unit includes a first dummy electrode unit and a second dummy electrode unit disposed in different layers, and the first dummy electrode unit and the second dummy electrode unit are coupled by a touch signal.

In some embodiments, a sum of the lengths of the plurality of electrically floating metal segments and a sum of the distances between the plurality of electrically floating metal segments are maintained unchanged.

Embodiments also relate to a touch screen panel. The touch screen panel comprises a touch electrode structure for detecting user touch inputs, the touch electrode structure including a layer of metal mesh type touch signal transmitting electrodes and a layer of metal mesh type touch signal receiving electrodes on a planar level above the transmitting electrodes. The touch screen panel also comprises receiving electrodes having additional wire branches that extend along the same planar level as the transmitting electrodes, the wire branches having specific shapes and dimensions to maximize a total surface area of the receiving electrodes to thus increase an amount of mutual capacitance or self-capacitance, and also to minimize any potential parasitic capacitance being formed at regions where portions of the transmitting electrodes and portions of the receiving electrodes overlap or cross over.

In some embodiments, the specific shapes and dimensions achieve a plurality of electrically floating metal segments that act to minimize electrostatic discharge effects when compared to a conventional touch electrode structure that lacks the metal segments in the wire branches.

In some embodiments, the touch screen panel further comprises a dummy electrode unit including a mesh pattern electrode disposed in non-touch sensing areas.

In some embodiments, the dummy electrode unit further includes a mesh pattern electrode disposed in a touch sensing area.

In some embodiments, the dummy electrode unit includes a first dummy electrode unit and a second dummy electrode unit disposed in different layers, and the first dummy electrode unit and the second dummy electrode unit are coupled by a touch signal.

In some embodiments, a sum of the lengths of the plurality of electrically floating metal segments and a sum of the distances between the plurality of electrically floating metal segments are maintained unchanged.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A touch screen panel for detecting a touch input, comprising:
   a plurality of touch sensors on a substrate, each touch sensor comprising:
   a first pattern electrode on the substrate entirely extending along a first direction, the first pattern electrode including a first mesh pattern;
   a first connection line electrically connected to the first pattern electrode, the first connection line extending along a second direction different from the first direction;
   a second pattern electrode on the substrate adjacent to the first pattern electrode, the second pattern electrode entirely extending along the first direction and including a second mesh pattern;
   a second connection line electrically connected to the second pattern electrode, the second connection line extending along the second direction and overlapping with at least a portion of the first pattern electrode; and
   a first floating electrode disposed in between the first pattern electrode and the second pattern electrode, the first floating electrode physically spaced apart from the first pattern electrode and the second pattern electrode, wherein the first pattern electrode and the second pattern electrode are arranged in different layers.

2. The touch screen panel of claim 1, wherein the first floating electrode is disposed between the portion of the first pattern electrode and the second pattern electrode.

3. The touch screen panel of claim 1, wherein the second connection line overlaps with the first floating electrode.

4. The touch screen panel of claim 1, wherein a part of the second connection line in an area between the portion of the first pattern electrode and the first floating electrode has a concave shape toward the substrate.

5. The touch screen panel of claim 1, further comprising an insulating layer on the first pattern electrode, and wherein the second connection line is disposed on the insulating layer.

6. The touch screen panel of claim 5, wherein the second pattern electrode is disposed on the insulating layer, and wherein the second connection line extends from the second pattern electrode.

7. The touch screen panel of claim 6, further comprising a third pattern electrode on the substrate extending in the first direction, the third pattern electrode electrically connected to the first pattern electrode through the first connection line.

8. The touch screen panel of claim 5, wherein the insulating layer is also disposed on the second pattern electrode, and wherein the second connection line is electrically connected to the second pattern electrode through a contact hole in the insulating layer.

9. The touch screen panel of claim 8, further comprising a pair of external lines extending from the second pattern electrode in the second direction, and wherein the first floating electrode is disposed between the pair of external lines.

10. The touch screen panel of claim 8, further comprising:
    a third pattern electrode on the insulating layer adjacent to the first pattern electrode, the third pattern electrode extending along the first direction and electrically connected to the second pattern electrode and the second connection line, the third pattern electrode including a third mesh pattern.

11. The touch screen panel of claim 10, further comprising a second floating electrode between the first pattern electrode and the third pattern electrode.

12. The touch screen panel of claim 10, further comprising:
    a third connection line extending in the second direction, the third connection line electrically connected to the second pattern electrode and the third pattern electrode; and
    a first external line extending from the second pattern electrode in the second direction, wherein the first external line is disposed between the second connection line and the third connection line in the first direction.

13. The touch screen panel of claim 12, further comprising:
    a second external line extending from the first pattern electrode in the first direction,
    wherein a shape of the first external line is different from a shape of the second external line.

14. The touch screen panel of claim 1, further comprising a plurality of floating electrodes including the first floating electrode disposed between the first pattern electrode and the second pattern electrode, wherein each of the floating electrodes is physically spaced apart from each other.

15. The touch screen panel of claim 1, wherein the first floating electrode is in a same layer as the first pattern electrode.

16. A touch screen panel for detecting a touch input, comprising:
- a plurality of touch sensors on a substrate, each touch sensor comprising:
- a first pattern electrode on the substrate extending along a first direction;
- a second pattern electrode on the substrate extending along the first direction;
- a first floating electrode disposed in between the first pattern electrode and the second pattern electrode, the first floating electrode physically spaced apart from the first pattern electrode and the second pattern electrode;
- an insulating layer on the first pattern electrode, the second pattern electrode, and the first floating electrode;
- a third pattern electrode on the insulating layer extending along the first direction and including a mesh pattern;
- a first connection line on the insulating layer, the first connection line extending from the third pattern electrode in a second direction different from the first direction to overlap at least a portion of the first pattern electrode and the first connection line electrically connected to the third pattern electrode,
- a second connection line extending in the second direction, the second connection line electrically connected to the first pattern electrode,
- wherein the second pattern electrode is electrically connected to the third pattern electrode through a contact hole in the insulating layer,
- wherein the second pattern electrode has a mesh pattern overlapping with the third pattern electrode,
- wherein the first pattern electrode, the second pattern electrode, the second connection line, and the first floating electrode are formed of a first layer,
- wherein the third pattern electrode and the first connection line is formed of a second layer, and
- wherein the first floating electrode totally overlaps with the first connection line.

17. The touch screen panel of claim 16, wherein the first connection line extends to overlap the first floating electrode.

18. The touch screen panel of claim 16, wherein the first floating electrode is disposed between the portion of the first pattern electrode and the second pattern electrode.

19. The touch screen panel of claim 16, wherein a part of the first connection line in an area between the portion of the first pattern electrode and the first floating electrode has a concave shape toward the substrate.

20. The touch screen panel of claim 16, further comprising a second floating electrode between the first pattern electrode and the third pattern electrode.

21. The touch screen panel of claim 16, further comprising a pair of external lines extending from the second pattern electrode in the second direction, and wherein the first floating electrode is disposed between the pair of external lines.

22. The touch screen panel of claim 16, wherein the first floating electrode is divided into a plurality of portions physically spaced apart from each other.

23. The touch screen panel of claim 16, wherein the first connection line is electrically connected to the second pattern electrode through a contact hole in the insulating layer.

* * * * *